United States Patent
Slanitsch et al.

(10) Patent No.: US 11,286,910 B2
(45) Date of Patent: *Mar. 29, 2022

(54) YAW AUTO-CALIBRATION FOR A WIND TURBINE GENERATOR

(71) Applicant: American Superconductor Corporation, Ayer, MA (US)

(72) Inventors: Gottfried Slanitsch, Sankt Georgen am Längsee (AT); Robert Tratnig, Sankt Margareten im Rosental (AT)

(73) Assignee: American Superconductor Corporation, Ayer, MA (US)

( * ) Notice: Subject to any disclaimer, the term of this patent is extended or adjusted under 35 U.S.C. 154(b) by 364 days.

This patent is subject to a terminal disclaimer.

(21) Appl. No.: 16/573,629

(22) Filed: Sep. 17, 2019

(65) Prior Publication Data

US 2020/0088166 A1 Mar. 19, 2020

Related U.S. Application Data

(60) Provisional application No. 62/732,501, filed on Sep. 17, 2018.

(51) Int. Cl.
*F03D 17/00* (2016.01)
*F03D 7/04* (2006.01)
(Continued)

(52) U.S. Cl.
CPC ........... *F03D 17/00* (2016.05); *F03D 7/0204* (2013.01); *F03D 7/046* (2013.01); *G01P 5/02* (2013.01);
(Continued)

(58) Field of Classification Search
CPC ........ F03D 17/00; F03D 7/0204; F03D 7/046; G01P 5/02; G01P 21/025
See application file for complete search history.

(56) References Cited

U.S. PATENT DOCUMENTS 8,410,625 B2 4/2013 Stiesdal et al.
2011/0101691 A1 5/2011 Hashimoto
(Continued)

FOREIGN PATENT DOCUMENTS

CN 101586526 A 11/2009
CN 102213182 A 10/2011
(Continued)

OTHER PUBLICATIONS

Larsen G C et al: "Wake meandering under non-neutral atmospheric stability conditions—theory and facts", Journal of Physics: Conference Series, Institute of Publishing, Bristol, GB, vol. 625, No. 1, Jun. 18, 2015.

(Continued)

*Primary Examiner* — Mark A Connolly
(74) *Attorney, Agent, or Firm* — Sunstein LLP

(57) ABSTRACT

A yaw auto-calibration method configured to calibrate at least one anemometer of a yaw control system to correct for yaw misalignment. The yaw auto-calibration method includes collecting wind turbine data over a plurality of time periods with respect to the at least one anemometer. The wind turbine data including one or more of mechanical speed, wind speed, turbine power, and wind direction. The method includes determining from the collected data a wind direction compensation signal associated with a plurality of operational parameter ranges and the wind direction compensation signals correspond to the effects on the at least one anemometer due to yaw misalignment. The method further includes providing the wind compensation signals to the yaw control system to adjust the wind direction data of the at least one anemometer for each of the associated operational parameter ranges.

20 Claims, 23 Drawing Sheets

(51) Int. Cl.
*G05B 19/042* (2006.01)
*G01P 5/02* (2006.01)
*F03D 7/02* (2006.01)
*G01P 21/02* (2006.01)

(52) U.S. Cl.
CPC .......... *G01P 21/025* (2013.01); *G05B 19/042* (2013.01); *F05B 2270/32* (2013.01); *F05B 2270/321* (2013.01); *F05B 2270/802* (2013.01); *G05B 2219/2619* (2013.01)

(56) References Cited

U.S. PATENT DOCUMENTS

| | | | |
|---|---|---|---|
| 2014/0167415 A1 | 6/2014 | Mykhaylyshyn | |
| 2017/0268484 A1 | 9/2017 | Li et al. | |
| 2017/0284375 A1 | 10/2017 | Nielsen | |
| 2018/0003153 A1* | 1/2018 | Damgaard | F03D 7/042 |
| 2021/0262439 A1* | 8/2021 | Yang | F03D 7/04 |

FOREIGN PATENT DOCUMENTS

| | | |
|---|---|---|
| CN | 204344371 U | 5/2015 |
| CN | 104912733 A | 9/2015 |
| CN | 106503406 A | 3/2017 |
| CN | 107664096 A | 2/2018 |
| CN | 109083808 A | 12/2018 |
| EP | 1 559 910 B1 | 11/2010 |
| EP | 2154362 B1 | 8/2014 |
| EP | 3112675 A1 | 1/2017 |
| WO | 2017108063 A1 | 6/2017 |

OTHER PUBLICATIONS

International Search Report and Written Opinion, dated Dec. 18, 2019, received in international patent application No. PCT/US19/051522, 10 pages.

International Search Report and Written Opinion, dated Dec. 18, 2019, received in international patent application No. PCT/US19/051532, 11 pages.

International Searching Authority/EP, International Search Report and Written Opinion of the International Searching Authority, Application No. PCT/US2019/051532, dated Dec. 18, 2019, 11 pages (previously submitted on June 11, 2020).

International Searching Authority/EP, International Search Report and Written Opinion of the International Searching Authority, Application No. PCT/US2019/051522, dated Dec. 18, 2019, 10 pages (previously submitted on June 11, 2020).

* cited by examiner

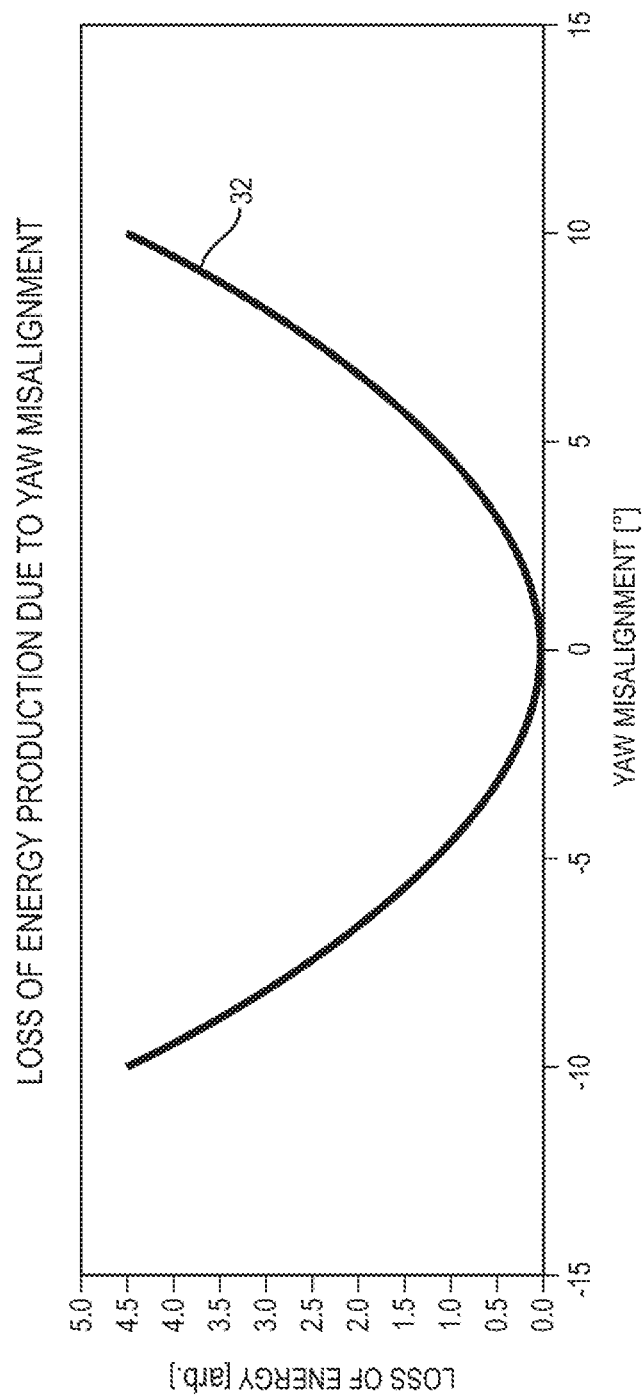

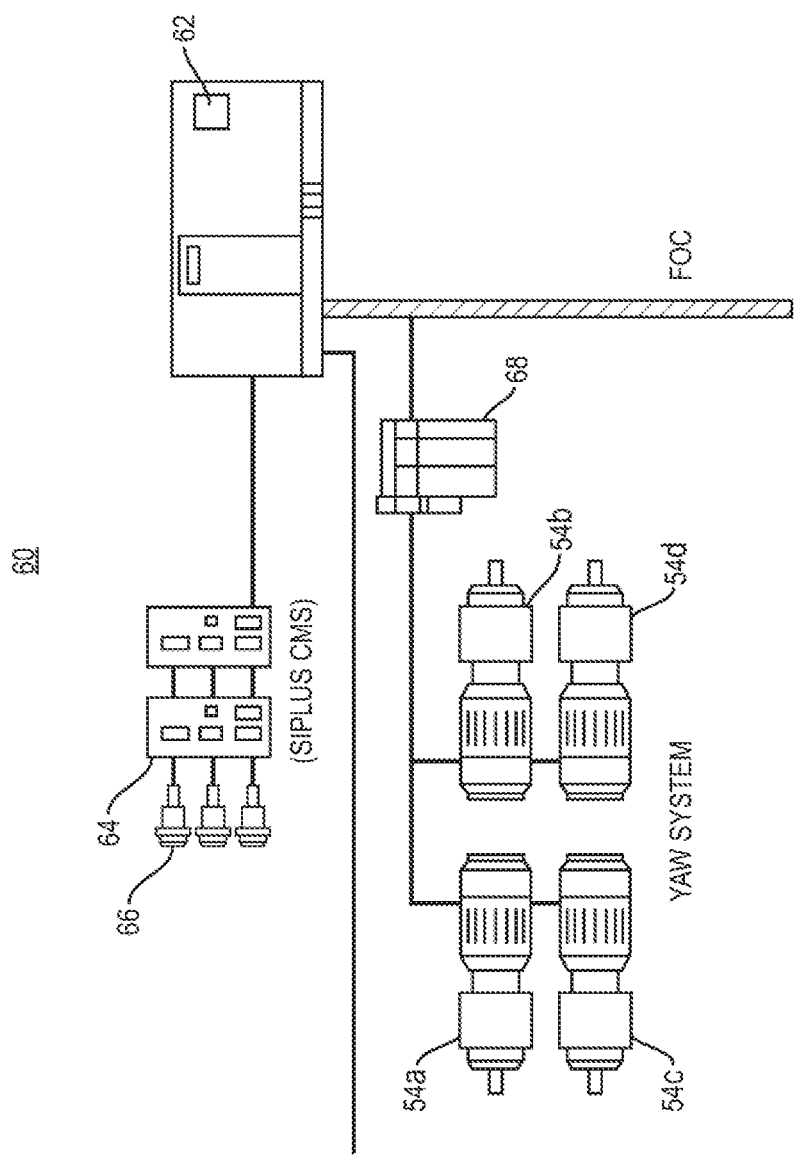

YAW AUTO-CALIBRATION FOR A WIND TURBINE GENERATOR

600a

| Mechanical speed range [rpm] | Wind direction range (WD) [°] | | | | | | | | | | |
|---|---|---|---|---|---|---|---|---|---|---|---|
| | [-10 to -8] | [-8 to -6] | [-6 to -4] | [-4 to -2] | [-2 to 0] | [0 to 2] | [2 to 4] | [4 to 6] | [6 to 8] | [8 to 10] |
| [3 to 4] | | | | | | | | | | |
| [4 to 5] | | | | | | | | | | |
| [5 to 6] | | | | 4 | | | | | | |
| [6 to 7] | | | | | | | | | | |
| [7 to 8] | | | | | | | | | 15 | | |
| [8 to 9] | | | | | | | | | | |
| [9 to 10] | | | | | | | | | | |
| [10 to 11] | | | | | | | | | | |

Number of valid averaged values (e.g. performance value, el. power) in the specific WS/WD cell for power range P 0% - 10%

| Mechanical speed range [rpm] \ Wind direction range (WD) [°] | [-10 to -8] | [-8 to -6] | [-6 to -4] | [-4 to -2] | [-2 to 0] | [0 to 2] | [2 to 4] | [4 to 6] | [6 to 8] | [8 to 10] |
|---|---|---|---|---|---|---|---|---|---|---|
| [3 to 4] | | | | | | | | | | |
| [4 to 5] | | | | | | | | | | |
| [5 to 6] | | | | | | | | | | |
| [6 to 7] | | | | 7 | | 2 | | | | |
| [7 to 8] | | | | | | | 18 | | | |
| [8 to 9] | | | | | | | | | | |
| [9 to 10] | | | | | | | | | | |
| [10 to 11] | | | | | | | | | | |

Number of valid averaged values (e.g. performance value, el. power) in the specific WS/WD cell for power range P 10% - 20%

600c - 600i (not shown)

| Mechanical speed range [rpm] | Wind direction range (WD) [°] | | | | | | | | | |
|---|---|---|---|---|---|---|---|---|---|---|
| | [-10 to -8] | [-8 to -6] | [-6 to -4] | [-4 to -2] | [-2 to 0] | [0 to 2] | [2 to 4] | [4 to 6] | [6 to 8] | [8 to 10] |
| [3 to 4] | | | | | | | | | | |
| [4 to 5] | | | | | | | | | | |
| [5 to 6] | | | | | | | | | | |
| [6 to 7] | | | | | | | | | | |
| [7 to 8] | | | | 5 | | | | | | |
| [8 to 9] | | | | | | | | | | |
| [9 to 10] | | | | | | | 18 | | | |
| [10 to 11] | | | | | | | | | | |

FIG. 16C

Number of valid averaged values (e.g. performance value, el. power) in the specific WS/WD cell for power range P 90% – 100%

YAW AUTO-CALIBRATION FOR A WIND TURBINE GENERATOR

CROSS-REFERENCE TO RELATED APPLICATION

This application claims the benefit of priority to U.S. Provisional Application No. 62/732,501, filed Sep. 17, 2018, which is incorporated herein by reference.

FIELD OF THE INVENTION

This invention relates to a yaw control system for a wind turbine generator and more specifically to such a yaw control system which utilizes a yaw auto-calibration approach.

BACKGROUND OF THE INVENTION

A wind turbine generator includes a stationary tower on top of which is mounted a nacelle containing an electrical generator mechanically attached to a rotor by a rotor shaft. The rotor comprises a hub that attaches one or more blades (typically three) which transforms the wind's kinetic energy to electrical energy via the electrical generator by rotation of the blade(s). The optimum operating point of a wind turbine generator is achieved when the rotor shaft is parallel to the direction of the wind, since this maximizes the energy produced while minimizing loads on the wind turbine generator.

The nacelle is rotatably mounted on the tower to enable the rotor to be positioned (yawed) in the direction of the wind through a mechanical system (yaw control system) that moves it to the desired orientation in order to best harness the wind and produce the most power. The yaw control system turns the wind turbine nacelle about a yaw axis, which coincides with the vertical axis of the tower, so that the rotational axis of the rotor shaft may be aligned parallel with the wind direction, in an optimal position. When the rotational axis of the rotor shaft is not parallel with the wind direction, there exists a yaw error determined by the angle of deviation of the rotational axis of the rotor shaft with respect to the optimal position.

Given the natural variability of the wind direction, there is a need for the yaw control system to constantly detect the wind direction and adjust the position of the wind turbine generator so as to best harness the wind to produce maximum power. Existing yaw control systems measure wind speed and wind direction using anemometers usually installed at the top of the wind turbine nacelle behind the rotor blades. However, it is difficult to track the true wind direction due to wind turbulence caused by the blades, the nacelle, as well as local topology, such as hills and other terrain elements. This results in sub-optimal alignment and a reduction in maximum wind/power capture. Therefore, there exists a need for a yaw control system which improves wind capture and thus power production efficiency.

With one existing yaw calibration approach, the wind speed measurement is an essential data source used for applying a yaw correction. The wind speed measurement is used as a basis for wind direction correction. There are significant disadvantages with this approach. The wind speed is usually measured behind the wind rotor on one single position and is therefore exposed to natural wind turbulence on one hand and to rotor/wind turbine induced turbulences on the other hand. Also systematic deviations (caused by rotation of the rotor or misalignment) are a severe factor in affecting wind speed measurement.

BRIEF SUMMARY OF THE INVENTION

In one aspect the invention features a yaw auto-calibration method configured to calibrate at least one anemometer of a yaw control system to correct for yaw misalignment. The yaw control system being configured to adjust a wind turbine nacelle position about a yaw axis to align the wind turbine with the direction of the wind inflow. The yaw auto-calibration method comprises collecting wind turbine data over a plurality of time periods with respect to the at least one anemometer and the wind turbine data includes one or more of mechanical speed, wind speed, turbine power, and wind direction. The method includes determining from the collected data a wind direction compensation signal associated with a plurality of operational parameter ranges; the wind direction compensation signals corresponding to the effects on the at least one anemometer due to yaw misalignment. The method also includes providing the wind compensation signals to the yaw control system to adjust the wind direction data of the at least one anemometer for each of the associated operational parameter ranges.

In other aspects of the invention one or more of the following features may be included.

The step of collecting may include calculating an average operational parameter and an average wind direction for each time period of the plurality of time periods for the at least one anemometer and binning the average operational parameter and average wind direction for each time period in a bin location based on a range of operational parameters and a range of wind directions. The operational parameter may include one or more of rotor speed, generator speed and turbine power. A performance value may be correlated to the average power of the electrical generator and the average wind speed may be calculated for each time period and is associated with the binned average operational parameter and average wind direction for that time period. The step of determining a wind direction compensation signal associated with an operational parameter range may include plotting for each operational parameter range a performance value calculated over the plurality of time periods against its corresponding average wind direction. The step of determining a wind direction compensation signal associated with an operational parameter range may further include determining from the plotted performance value, a maximum performance value for each operational parameter range, and wherein the step of determining may also include plotting the wind direction compensation signal associated with each said maximum performance value relative to the associated operational parameter range. The step of providing the wind direction compensation signals to the yaw control system may include providing the plotted wind direction compensation signals associated with each said maximum performance value relative to the associated operational parameter range to the yaw control system. The wind turbine may be a variable speed wind turbine having a variable speed range, and wherein the average operational parameter may be determined only when said variable speed turbine is operating in said variable speed range for at least a portion of the time period. The wind turbine may be a fixed speed wind turbine having at least one speed operating point with substantially no speed variability at said at least one operating point and wherein the average operational parameter may be determined for a time period only when the fixed speed turbine has operated at said at least one speed operating point during at least a portion of the time period. The step of plotting the wind direction compensation signals may include extrapolating the wind direction compensation signals for at least one operational parameter range. Plotting the wind direction compensation signal associated with each said maximum performance value relative to the associated operational parameter range the associated operational parameter range may include plotting the wind direction compensation signal relative to one of rotor speed or generator speed and adjusting the wind direction signal based on the measured turbine power. The step of binning the average operational parameter and average wind direction for each time period in a bin location based on a range of operational parameters and a range of wind directions may include using two dimensional binning wherein there are a plurality of bin matrixes, each matrix corresponding to a different range of a first operational parameter and each matrix including a range of a second operational parameter relative to the range of wind directions.

In another aspect the invention features a yaw auto-calibration system configured to calibrate at least one anemometer of a yaw control system to correct for yaw misalignment, the yaw control system configured to adjust a wind turbine nacelle position about a yaw axis to align the wind turbine with the direction of the wind inflow. The yaw auto-calibration system includes a collection module for obtaining wind turbine data over a plurality of time periods with respect to the at least one anemometer. The wind turbine data includes one or more of mechanical speed, wind speed, turbine power, and wind direction. The system also includes a calculation module for determining from the collected data a wind direction compensation signal associated with a plurality of operational parameter ranges; the wind direction compensation signals corresponding to the effects on the at least one anemometer due to yaw misalignment. There is a transfer module configured to provide the wind direction compensation signals to the yaw control system to adjust the wind direction data of the at least one anemometer for each of the associated operational parameter ranges.

In further aspects of the invention one or more of the following features may be included. The collection module may be configured to calculate an average operational parameter and an average wind direction for each time period of the plurality of time periods for the at least one anemometer and binning the average operational parameter and average wind direction for each time period in a bin location based on a range of operational parameters and a range of wind directions. The operational parameter may include one or more of rotor speed, generator speed and turbine power. The calculation module may be configured to calculate a performance value correlated to the average power of the electrical generator and the average wind speed for each time period and is associated with the binned average operational parameter and average wind direction for that time period. The calculation module may be configured to plot for each operational parameter range a performance value calculated over the plurality of time periods against its corresponding average wind direction. The calculation module may be configured to determine from the plotted performance value, a maximum performance value for each operational parameter range and to plot the wind direction compensation signal associated with each said maximum performance value relative to the associated operational parameter range. The transfer module may be further configured to provide the plotted wind direction compensation signals associated with each said maximum performance value relative to the associated operational parameter range to the yaw control system. The wind turbine may be a variable speed wind turbine having a variable speed range, and the average operational parameter may be determined only when said variable speed turbine is operating in said variable speed range for at least a portion of the time period. The wind turbine may be a fixed speed wind turbine having at least one speed operating point with substantially no speed variability at said at least one operating point and wherein the average operational parameter may be determined for a time period only when the fixed speed turbine has operated at said at least one speed operating point for at least a portion of the time period. The calculation module may be configured to extrapolate the wind direction compensation signals for at least one operational parameter range when plotting the wind direction compensation signals. The calculation module may be configured to plot the wind direction compensation signal relative to one of rotor speed or generator speed and adjust the wind direction compensation signal based on the measured turbine power. The collection module may be configured to use two dimensional binning, wherein there may be a plurality of bin matrixes, each matrix may correspond to a different range of a first operational parameter and each matrix may include a range of a second operational parameter relative to the range of wind directions.

An objective of this invention is to use a mechanical speed (rotor or generator speed) and/or an electrical parameter of the wind turbine, for example, turbine power, as an indirect measure of the wind speed. By using these rather than wind speed directly the invention has the benefit of averaging wind speed over the whole rotor plane and filtering in time; therefore, this approach provides more robust operation state information than using wind speed measurement and, as a result, better performance.

These and other features of the invention will be apparent from the following detailed description and the accompanying figures, in which:

BRIEF DESCRIPTION OF THE FIGURES

FIG. 4 is a plot of lost energy production due to yaw misalignment.

FIG. 6 is a schematic block diagram of a yaw control system according to an aspect of this invention.

FIG. 16A is a mechanical speed/wind direction binning matrix—having an operating power range P 0%-10% depicting two dimensional binning according to an aspect of this invention.

FIG. 16B is a mechanical speed/wind direction binning matrix having an operating power range P 10%-20% depicting two dimensional binning according to an aspect of this invention.

FIG. 16C is a mechanical speed/wind direction binning matrix having an operating power range P 90%-100% depicting two dimensional binning according to an aspect of this invention.

DETAILED DESCRIPTION OF INVENTION

Figure 1:
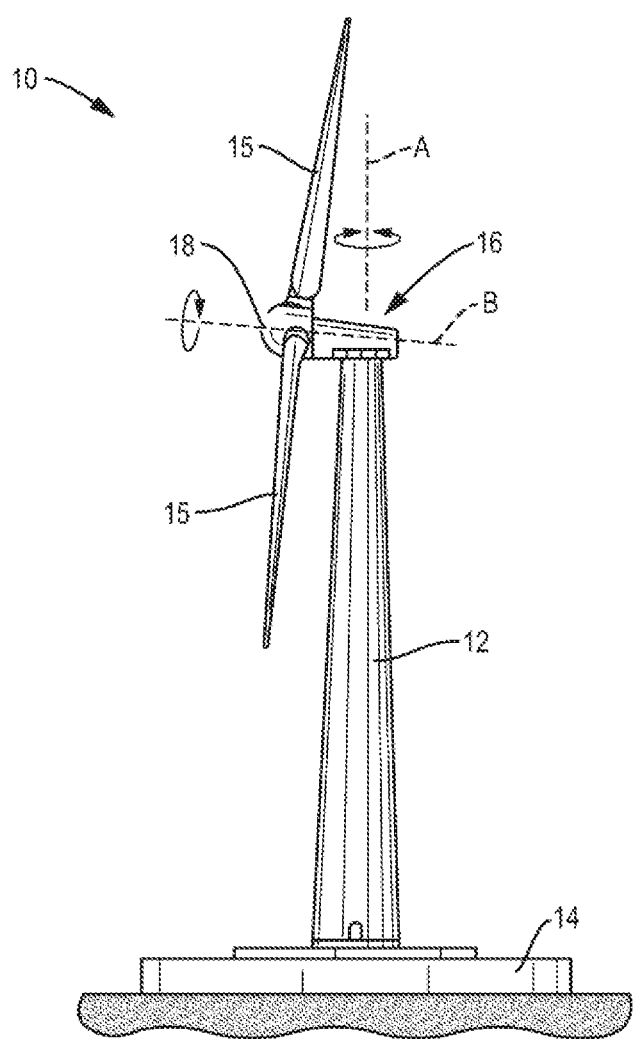
FIG. 1 is a side elevational view of a wind turbine generator according to an aspect of the invention.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

This disclosure relates to systems and methods to improve the power performance of wind turbine generators using a yaw auto-calibration algorithm which provides a way to more accurately adjust the yaw of a wind turbine generator to properly align with the wind inflow direction. The disclosure adjusts the optimum inflow direction based on, one or more wind turbine parameters, such as generator speed, rotor speed, and/or wind turbine power by linear compensation. This can be achieved because the deflection of the wind field behind the rotor is roughly linearly dependent on the generator/rotor speed due to the law of conservation of angular momentum. It also relates to turbine power output.

Figure 8:
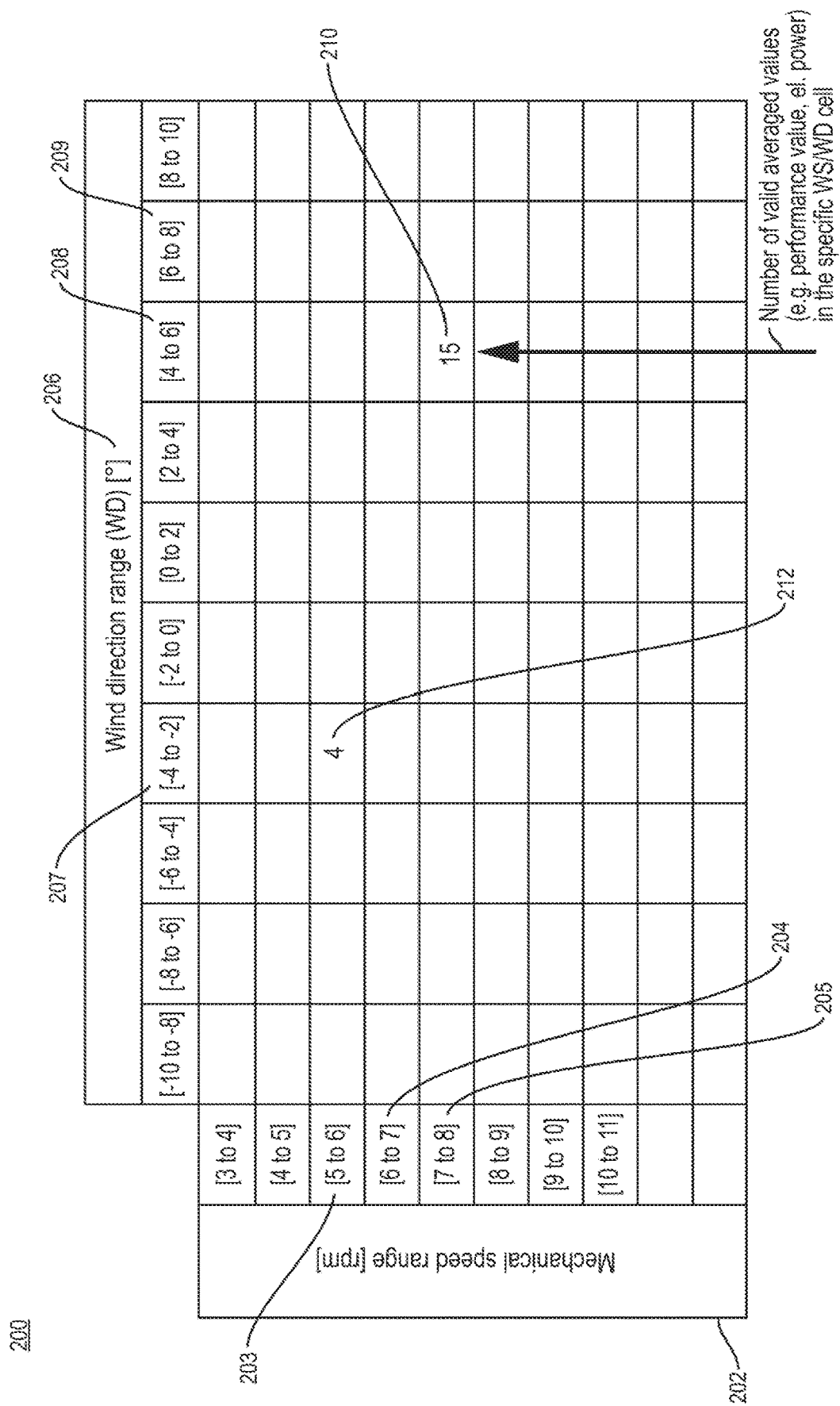
FIG. 8 is a mechanical speed/wind direction binning matrix according to an aspect of this invention.

For turbines operating at substantially constant generator/rotor speed (like single/multiple constant speed value wind turbines, but also variable speed turbines at the upper and lower limits of their speed range) the system/method may also be implemented. However, in these constant speed turbines when operating at the one or more constant speed operating points, optimal wind direction correction cannot be performed based on the generator/rotor speed alone. Therefore, the wind direction correction is improved by using the measured turbine power and obtained from the values stored in the rows of the matrix Mij, described below with respect to FIG. 8.

The disclosure thus accounts for deviations and variations of the optimum inflow direction caused by any reason, including but not limited to e.g. wind turbulence effects, seasonal changes, soiling or aging of the rotor blades, mechanical anemometer misalignment, improper software yaw parameter values. The algorithm works by adjusting all anemometers independently and can thus compensate if one anemometer fails. It also determines if one anemometer shows sudden shifts or other measurement problems. It should be noted that the term anemometer as used herein includes any possible wind speed or wind direction data acquisition device(s) or method.

The deviations and variations of the optimum inflow direction, as described herein, may result in yaw misalignment of the nacelle and reduced energy production. The automated yaw calibration algorithm of this disclosure "learns" the optimum yaw compensations for various rotor speeds, generator speeds and/or turbine power output levels. That way, for every operating condition the turbine produces the maximum energy output.

Referring to FIG. 1 there is shown a side view of the overall structure of a wind turbine generator 10. The wind turbine generator 10 includes a tower 12 disposed on a foundation 14. There is a nacelle 16 provided on the upper end of the tower 12, which nacelle is rotatable around a substantially vertical axis A. Nacelle 16 is rotatably mounted on the tower to enable the rotor to be positioned (via yawing) in the direction of the wind inflow via a yaw control system in order to best harness the wind and produce the most power. The yaw control system turns the wind turbine nacelle about vertical axis A (the yaw axis), so that the rotational axis of the rotor shaft (axis B) may be aligned parallel with the wind inflow direction.

Rotor hub 18 is mounted on the nacelle 16 for fixing rotor blades 15. Rotor hub 18 is rotatable around rotation axis B. Blades 15 are attached to the rotor hub 18 so as to be radially disposed about rotation axis B. Wind power supplied to blades 15 is converted into mechanical power for rotating the rotor hub 18 around the rotation axis B and an electrical generator (not shown) in the nacelle converts the mechanical energy into electrical energy. The yaw control system turns the turbine nacelle 16 about the yaw axis A, so that the rotational axis B of the rotor shaft may be aligned parallel with the wind direction to produce the most power.

Figure 2A:
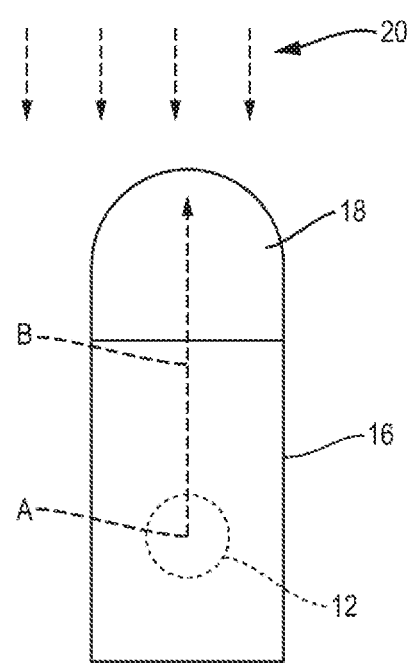
FIG. 2A is a top plan view of the nacelle of FIG. 1 with the nacelle optimally aligned with the wind inflow direction.

Referring to FIG. 2A, there is shown a top down view of nacelle 16 and rotor hub 18 of FIG. 1, rotatable about yaw axis A, which is aligned with the longitudinal axis of tower 12. In this view the yaw axis A is coming out of the page.

The rotational axis of the rotor shaft, axis B, is shown to be aligned parallel with the wind direction, which is indicated by arrows 20. This is the optimal position for the nacelle to ensure maximum wind capture and power production.

Figure 2B:
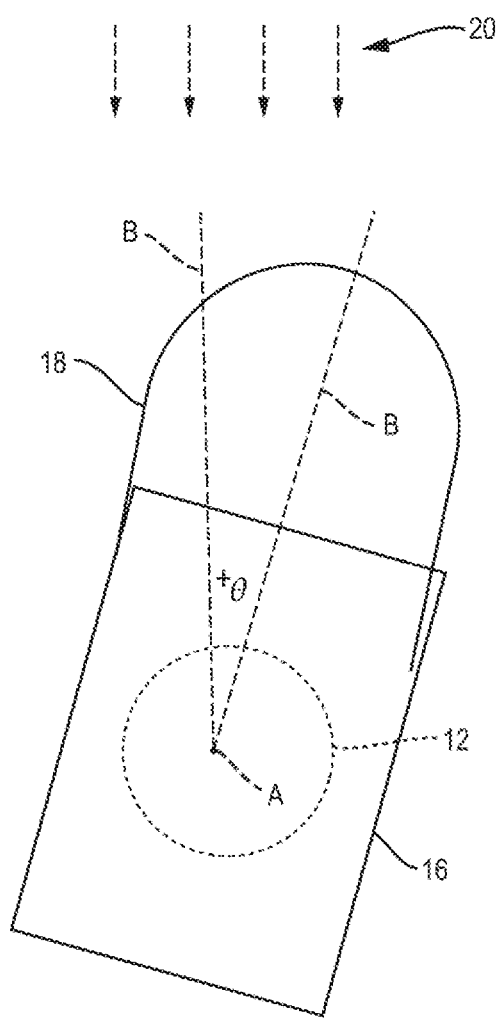
FIG. 2B is a top plan view of nacelle of FIG. 1 with the nacelle out of alignment with the wind direction.

However, as noted above, in existing wind turbine generators, the yaw control system measures wind speed and wind direction using anemometers usually installed at the top of the wind turbine nacelle behind the rotor blades. Due to wind turbulence caused by the blades, the nacelle, as well as local topology, the nacelle is often not optimally aligned with the wind inflow direction, which results in a reduction in wind/power capture. An example of this is shown in FIG. 2B, where the rotational axis of the rotor shaft, axis B, is shown to be misaligned with the wind inflow direction by an angle, $\Theta$, which may be as low as below 1 degree to greater than 20 degrees. The misalignment may be in both the clockwise (+) direction and the counter-clockwise (−) direction of rotation about the yaw axis. In the example of FIG. 2B, the direction of misalignment of the nacelle is in the clockwise or positive direction, so the angle of misalignment may be designated as $+\Theta$. The nacelle would need to be relocated in the counterclockwise direction by $-\Theta$ to be properly aligned with the wind inflow direction. Thus the actual wind inflow direction relative to axis B is also $-\Theta$.

Figure 3A:
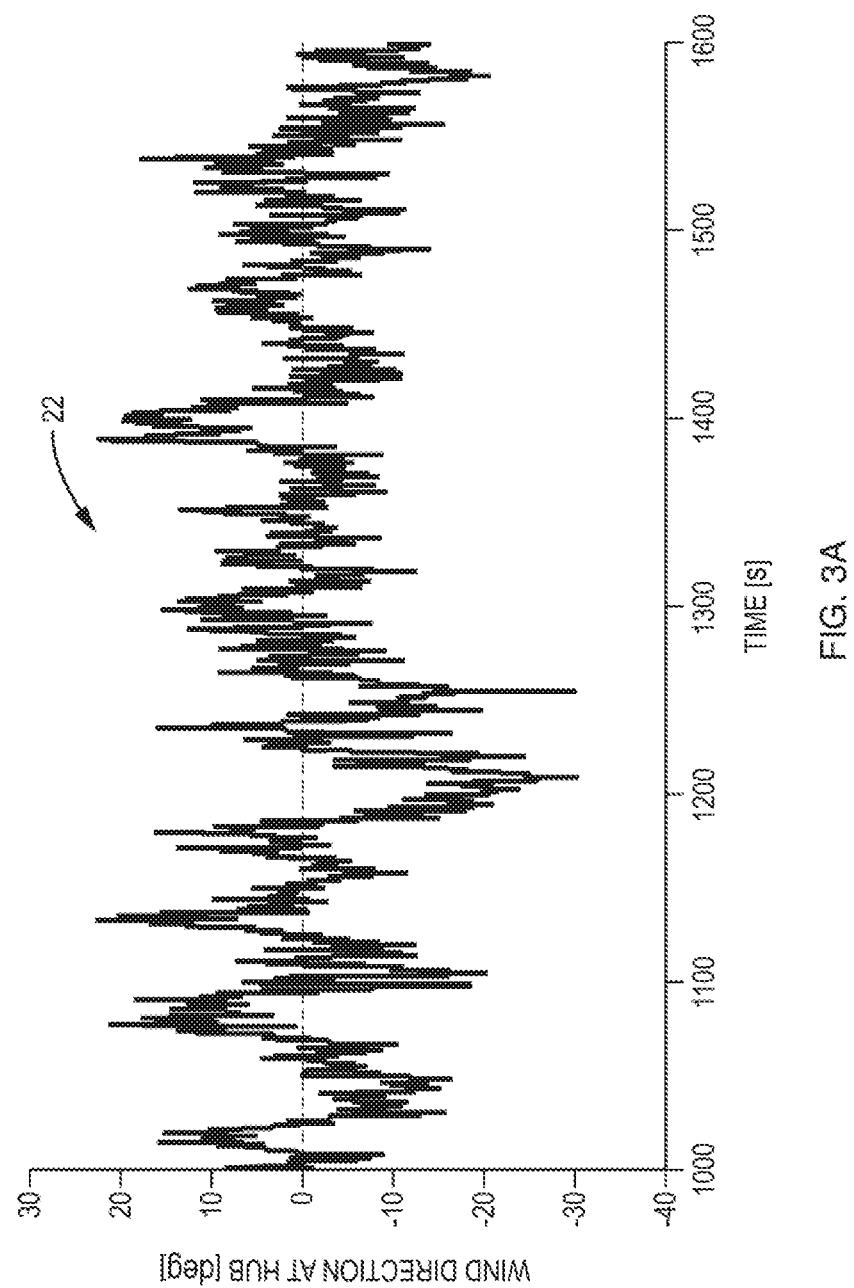
FIG. 3A is a plot of the wind direction relative to the rotor hub over a ten-minute period due to turbulence.
Figure 3B:
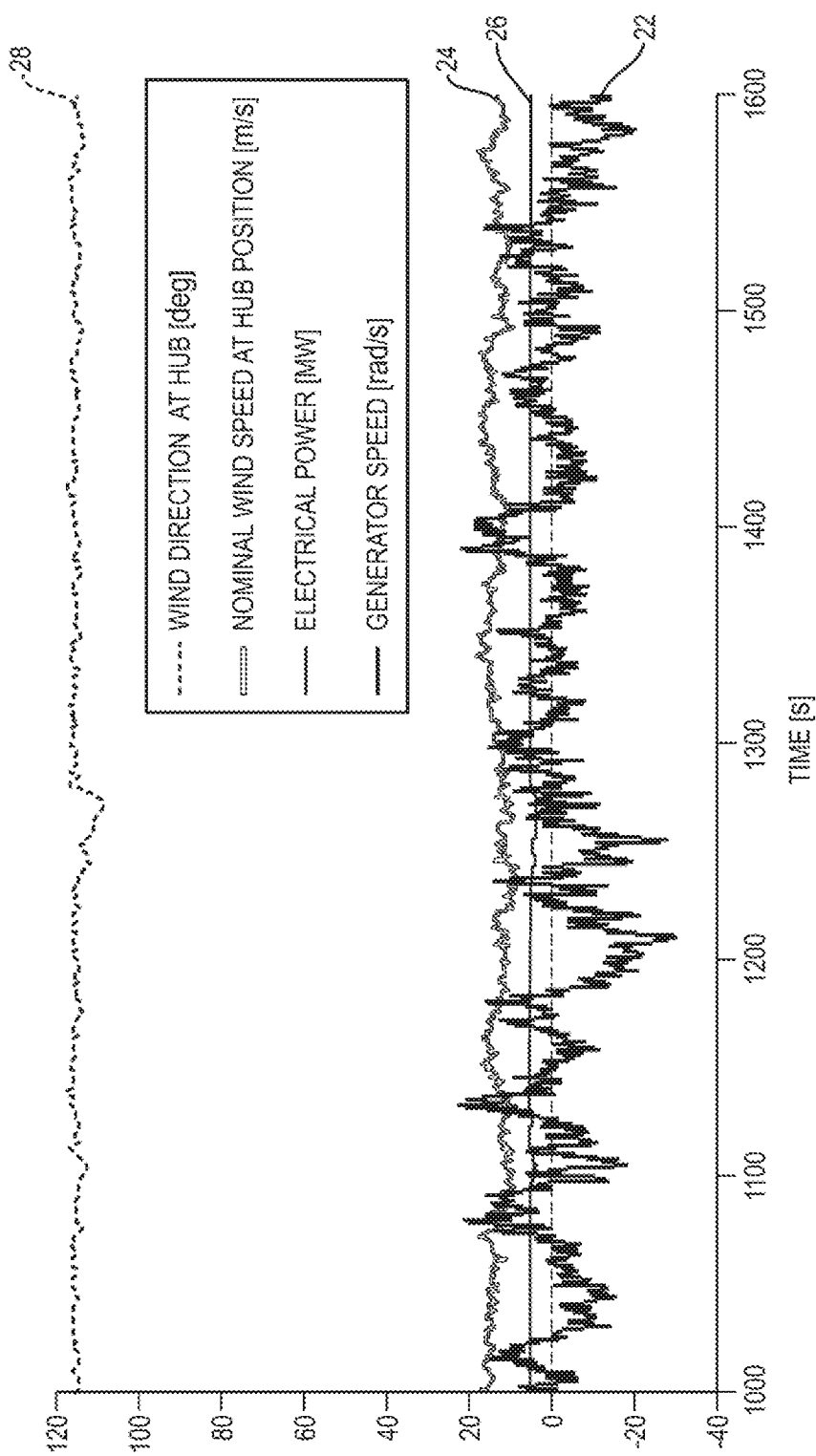
FIG. 3B is the plot of FIG. 3A of wind direction with wind speed, electrical power, and rotor speed superimposed thereon.

To illustrate an example of the effect of turbulence on wind direction, plot 22, FIG. 3A, shows wind direction in degrees as measured at the wind turbine hub over time (600 seconds/10 minutes). Plot 22 shows that the wind direction ranges from over positive 20 degrees to nearly negative 30 degrees relative to the rotational axis of the rotor shaft (see axis B in FIGS. 2A and 2B). In FIG. 3B, wind direction plot 22 is shown with the wind speed at the rotor hub superimposed as plot 24 over the ten-minute period. There are also shown superimposed electrical generator power output 26 in MW and electrical generator rotational speed 28 in radians/second over the same ten-minute period. From these plots, the following average values may be calculated as follows:

wind direction (WD_ave)=−1.3 [°]
wind speed (WS_ave)=13.3 [m/s]
power (P_ave)=5.3 [MW]
generator speed (GS_ave)=1098 [rpm]

Nacelle misalignment, as illustrated in FIG. 2B, can result in a significant loss of energy production as illustrated by graph 30, FIG. 4, which plots average yaw misalignment on the X-axis versus energy loss on the Y-axis. Curve 32 depicts an example of expected power loss over a range of yaw mis-alignment angles from −10 to +10 degrees relative to optimal alignment at 0 degrees (into the wind inflow direction). With curve 32, a power loss increasing with yaw misalignment is shown.

The yaw auto-calibration algorithm according to an aspect of this invention provides a way to periodically adjust or calibrate the anemometers on the wind turbine to account for the misalignment described above. Using the auto-calibration method herein for the anemometers, the nacelle position controlled via a yaw control system may be better aligned with the actual wind inflow direction and thus produce more power and place less strain on the wind turbine components.

Figure 5:
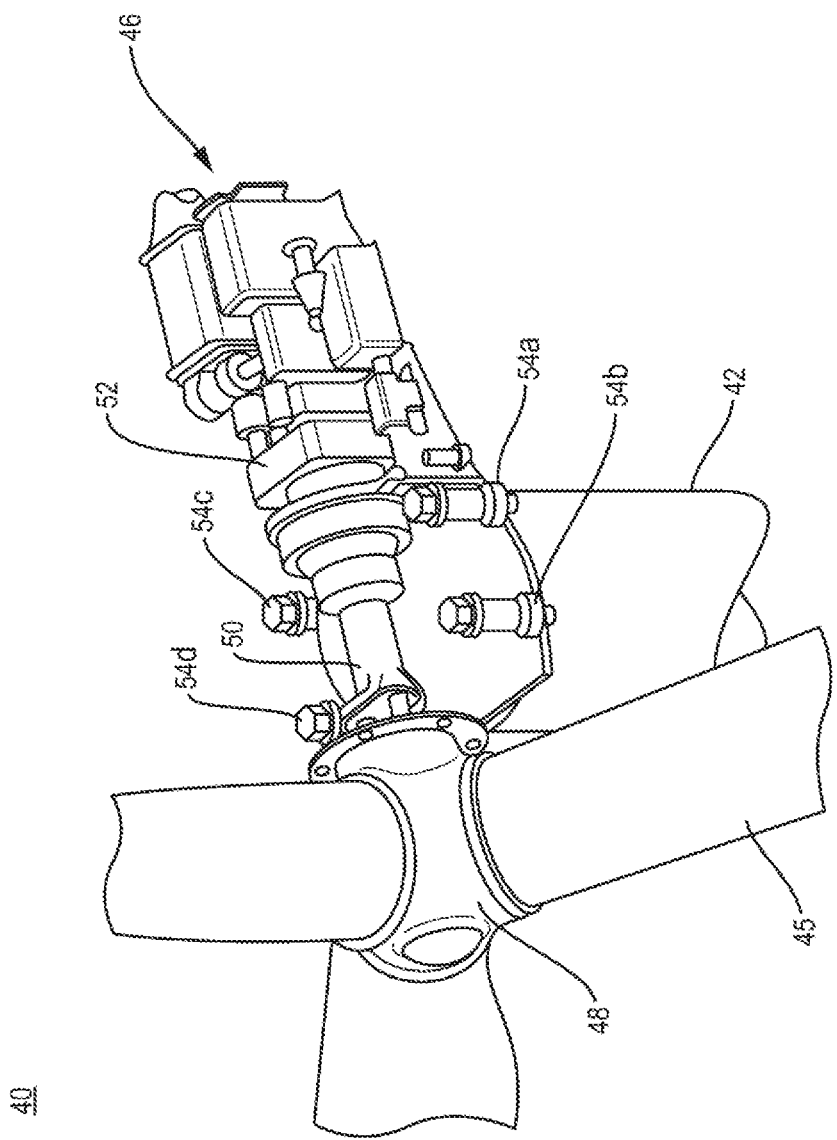
FIG. 5 is a perspective view of a wind turbine nacelle with its external cover removed to show the internal components including the yaw system.

A perspective view of a wind turbine generator 40 is shown in FIG. 5 to include a nacelle 46 mounted on top of tower 42. In this view, the interior of nacelle 46 is shown with the nacelle cover removed so that certain components are visible. Within nacelle 46 is shown a shaft 50, which interconnects on one end to rotor hub 48 and on the opposite end to the gearbox/generator 52. The yaw control system includes yaw motors, 54a, 54b, 54c, and 54d, which cause the nacelle 46 to rotate about the yaw axis (aligned with longitudinal axis of tower 42). The yaw motors interact with a yaw bearing to rotate the nacelle.

The mechanical components of the yaw control system may vary depending on the design characteristics, but would at least include a rotatable connection between nacelle 46 and tower 12 via a yaw bearing (not shown), on which the nacelle 46 may be rotated by the yaw motors. There is typically a means of restricting the rotation of the nacelle 46, e.g. a yaw brake and a control system, described below, which processes the signals from various sensors and gives the proper commands to the actuating mechanisms.

The yaw control system 60 is schematically depicted in FIG. 6 to include a programmable logic controller (PLC) 62, which controls the overall function of the wind turbine, including the yaw control. The yaw controller may be implemented in a yaw control software module running on the PLC 62. PLC 62 receives sensor signals from sensor electronics 64, which in turn receive sensor inputs from an array of sensors 66, including but not limited to a generator speed sensor, a rotor speed sensor, and/or a turbine power sensor as well as anemometers for measuring wind speed and direction. Yaw control signals are provided from PLC 62 to a yaw drive controller 68. The yaw drive controller 68 outputs control signals to yaw motors 54a, 54b, 54c, and 54d based on the control signals received from PLC 62 to adjust the position of the nacelle 46 about the yaw axis.

Yaw control software module adjusts nacelle yaw on a continuous basis to align the wind turbine with the direction of the wind. PLC 62 may also run software/firmware implementing the yaw auto-calibration algorithm according to an aspect of this invention. This algorithm periodically adjusts or calibrates the anemometers by providing a wind direction compensation signal in degrees (+ or −) to account for wind turbulence or other reasons of misalignment which impacts the accuracy of each anemometer. For a simple example, as shown in FIG. 2B the ideal wind direction compensation signal would indicate $-\Theta$. This compensation signal may be added to the wind direction angle output by the anemometers to provide more accurate readings.

YAW Auto-Calibration Algorithm

The yaw auto-calibration algorithm is designed to work on the basis of statistical data obtained over a multi-minute period, for example, a ten-minute period. The description herein utilizes a ten-minute period, however the period length may be adjusted based on wind turbine design and/or wind conditions. The period may typically be in the range of several minutes, i.e. significantly longer than the control period for the main yaw control algorithm.

The algorithm may utilize various parameters and variables, for example, those set forth in Annex A in four tables:

Table 1—Input Channels from the Wind Turbine Generator Programmable Logic Controller (PLC)
Table 2—Iteration Parameters
Table 3—Turbine Parameters
Table 4—Internal Variables In general, most of the variables are average values obtained over each period. However, some are not average values; namely, for example the minimum and maximum generator rotational speed values over the period (in variable speed controlled turbines). In turbines with variable speed control, the average generator speed is used to assess whether the turbine was operating in the variable speed range of the turbine or at rated speed. Some parts of the algorithm are only activated if the turbine is running in the variable speed range of the turbine and thus data values taken in the variable speed range are the only valid ones. The intention of the algorithm is to directly take logged data for the calculation over the course of the period, e.g. over ten minutes. If for some reason that is not possible, the statistical quantities may be calculated from live/real-time data. All vector and matrix elements of the variables in tables must be initialized with value 0 if not noted otherwise.

The yaw auto-calibration algorithm waits until all trigger conditions for valid data for at least one anemometer are fulfilled. As soon as that is the case, a data capture period, e.g. a 10-minute interval, is triggered. The interval will be completed if all criteria remain valid during that period for at least one anemometer. Otherwise, the interval is interrupted and the system waits for a new trigger.

The yaw auto-calibration algorithm provides a way to adjust a wind turbine to properly align it with the wind inflow direction. Once set up and parametrized properly, the algorithm works automatically and continuously. It thus accounts for variations of the optimum wind inflow direction due to seasonal changes and soiling or aging of the rotor blades and other causes of turbulence or misalignment. The algorithm works for all anemometers independently and can thus compensate if one anemometer fails. It will also detect if one anemometer shows sudden shifts or other measurement problems.

Figure 7A:
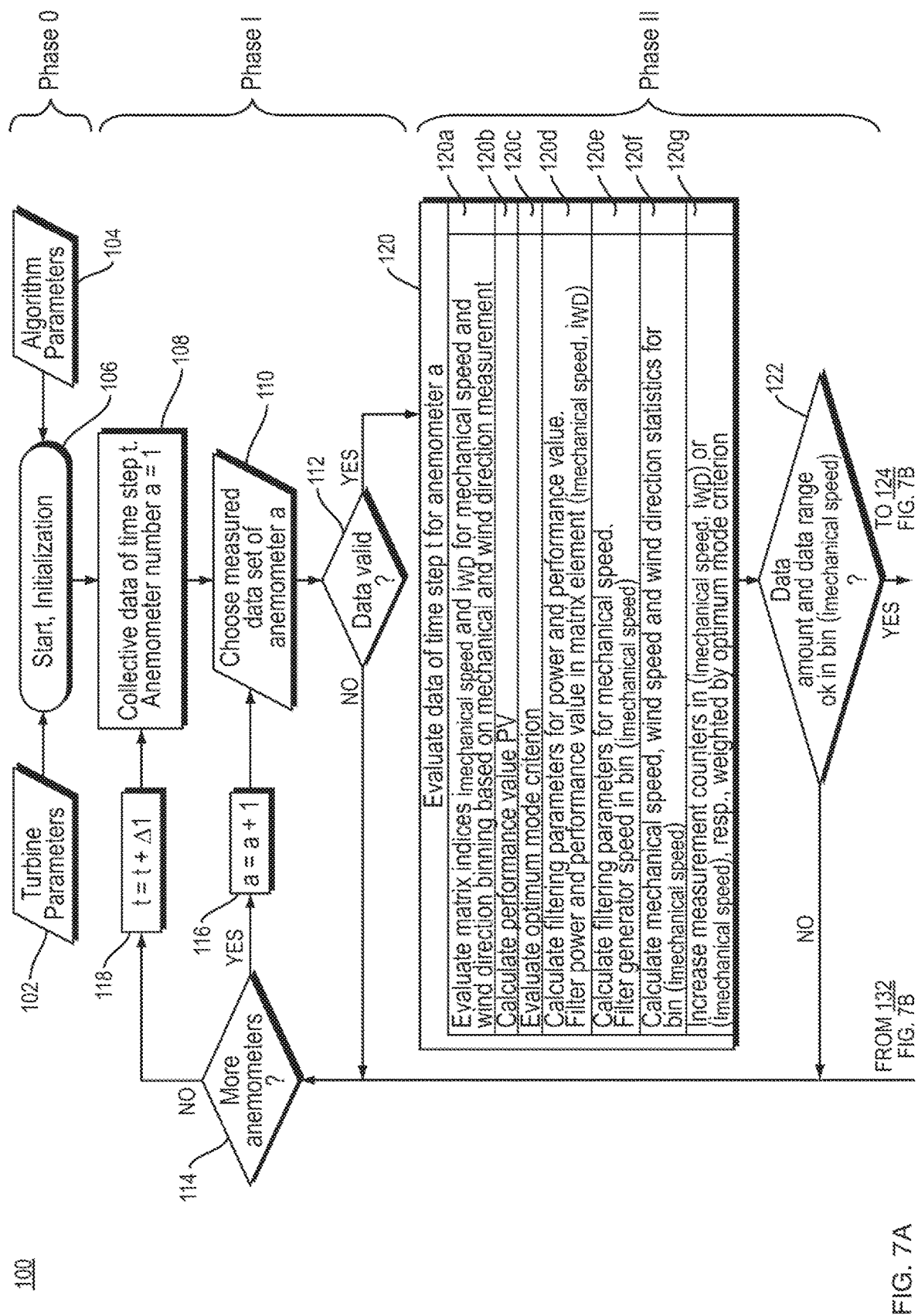
FIGS. 7A and 7B is a flow chart of the smart yaw calibration algorithm according to an aspect of this invention.
Figure 7B:
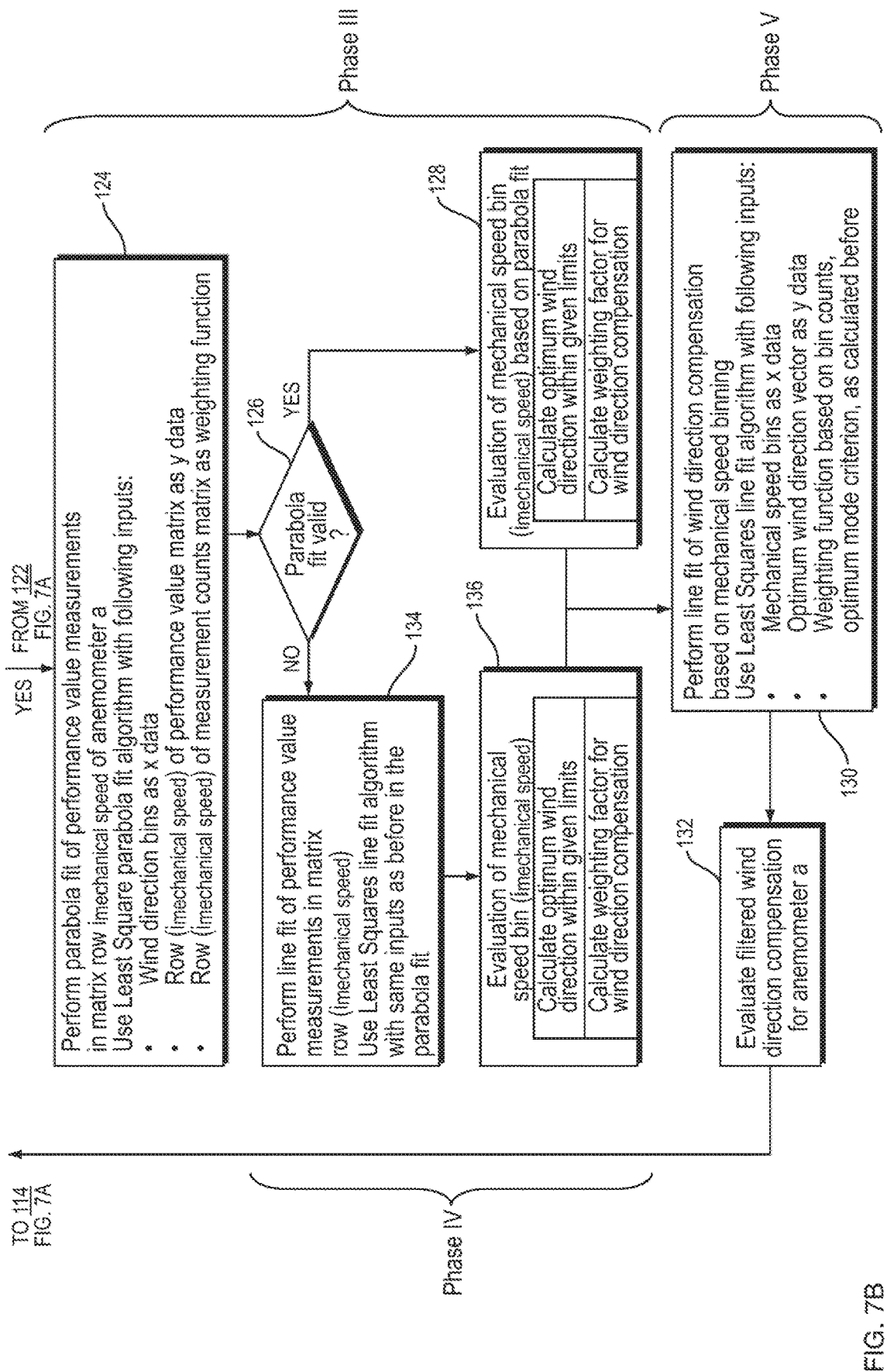

Referring to FIG. 7, there is shown a flow chart 100 describing the yaw auto-calibration algorithm according to an aspect of the invention. In an initialization phase, Phase 0, the turbine parameters (Table 3, Annex A) are collected at step 102 and the algorithm parameters are collected at step 104. At step 106, the initialization of internal variables is undertaken by initializing to a value of zero unless noted otherwise.

In Phase I of flow chart 100, at step 108, live data collection begins and continues over the time period t (in this case ten minutes) for each anemometer. From step 108, anemometer counter variable a is initially set to 1, so the measured data set of anemometer 1 is chosen in step 110. In step 112 it is determined if the chosen data set is valid or not. If the data set is determined to not be valid, at step 114 the system assesses whether there are other anemometers from which data needs to be assessed for the current time period. If there are additional anemometers from which data has been collected, at step 116, the variable a is incremented by 1 and at step 110 the data set for anemometer 2 (i.e. the next anemometer) is collected and the process continues. If at step 114, it is determined that there are no additional anemometers, at step 118, the system waits until the next time period, e.g. at the expiration of ten minutes from the current time period (t=t+10), before proceeding again to step 108 to begin to collect live data for the next time period.

If at step 112 the data is determined to be valid, the system proceeds to step 120 in Phase II of flow chart 100, where the data set for anemometer a is evaluated for time period t. Step 120 includes a number of sub-steps (120a-g) which may be described herein in the specification and/or further described in Annex B. In step 120, the data set matrix indices iMS and iWD are evaluated for mechanical speed (such as generator speed or rotor speed) and wind direction binning based on measured mechanical speed and wind direction measurements and subsequent calculations are performed. The data set chosen for anemometer a is organized in a matrix Mij where the indices i and j are:

i . . . mechanical peed bin number based on mechanical speed measurement; and j . . . Wind direction bin number based on wind direction measurement of anemometer a.

In sub-step 120(a) the matrix indices are evaluated. As one example, refer to matrix 200, FIG. 8, which depicts a number of mechanical speed bins (MSi), in this case is rotor speed, each bin having a mechanical speed range. Alternatively, generator speed could be measured and binned or even turbine power. Along the first column 202 of table 200, bin 203 is designated as having a mechanical speed range, e.g. 5-6 rpm, bin 204 is designated as having a mechanical speed range of 6-7 rpm, and bin 205 is designated as having a mechanical speed range of 7-8 rpm. Across the top row 206 are wind direction bins (WDj), each bin having a wind direction range, e.g. (−4)-(−2) degrees (207), (+4)-(+6) degrees (208), (+6)-(+8) degrees (209). Various numbers of bins and ranges of mechanical speeds and wind directions may be used depending on the particular wind turbine and siting of the turbine.

Over an extended time (i.e. many time periods t), numerous valid point—triples (i.e. −WD_ave_i, MS_ave_i, P_ave_i), are collected and classified/stored in the mechanical speed—wind direction matrix 200. If applicable, also the wind speed data can be collected. From the mentioned values WD_ave_i is the average wind direction over a time period ti, WS_ave_i is the average wind speed over the time period ti, P_ave_i is the average power output of the wind turbine over time period ti and MS_ave_i is the average mechanical speed over the time period ti. For example, the data (e.g. average power, average wind speed) for a mechanical speed average of between 7 and 8 rpm with a wind direction average of 4-6 degrees would be stored in bin 210 at the intersection of the row defined by mechanical speed bin 205 and the column defined by wind direction 208. The average power for that time period is associated with the mechanical speed and wind direction to form the valid point—triple for that time period.

In bin 210 of matrix 200, for example, there is shown the number "15" which indicates that in the according bin there are fifteen averaged valid point—triples which have been stored in that bin over some extended period of time. In bin 212 there is the number "4" which indicates that over the same period of time only four averaged valid point—triples which had an average mechanical speed in the 5-6 rpm range and the (−4)-(−2) degree wind direction range, had been saved.

For each averaged valid point—triple, using the average mechanical speed and power obtained, a performance value (PV) (sub-step 120b) can be calculated as follows:

$$PV = \frac{P_{ave}}{WS_{ave}^3}$$

Alternatively, a continuous performance value PV_c can be calculated with the instantaneous power and wind speed values, and the performance value PV can then be calculated as the average of the continuous performance value PV_c.

It should be noted that as the power depends on the air density, the PV may be density corrected using a measured temperature T, which is also stored in the bin associated with each valid point—triple. Similarly, other identified and/or known effects that influence the result of the performance value calculation, can be used as correction factors (e.g. possible influence of turbine misalignment onto measured wind speed). The performance value (PV) is an indication of how effectively the blades are capturing the wind. In other words, the higher the PV, the more efficient the turbine performance which correlates to a better alignment with the wind inflow direction.

For each mechanical speed bin/range, the various wind direction bins/ranges can be assessed to determine the wind direction with the best performance value. The best performance value is an indicator of the maximum power output of the turbine for a given mechanical speed. As shown in graph 250 of FIG. 9, the PV values for a given average mechanical speed n are plotted over the wind direction. This is represented by one row in the MS/WD table 200 of FIG. 8, e.g. one of the rows for mechanical speed ranges 5-6 rpm (bin 203), 6-7 rpm (bin 204), or 7-8 rpm (bin205).

Sub-steps 120b-120g of step 120, are described in Annex B. The yaw auto-calibration algorithm works with either compensated or uncompensated wind speed and wind direction measurement data. However, the use of compensated values of the wind speed measurements is preferred.

Upon completion of step 120, the system proceeds to step 122 where the data amount and data range from step 120 is assessed. If the data amount and range are unsatisfactory, then the system reverts to step 114 where it is determined if there are other anemometers to assess and proceeds in the manner described above. If the data amount and range are satisfactory, then the system proceeds to step 124, in Phase III of the flow chart 100, to perform a parabola fit on the PV data points plotted.

Figure 9:
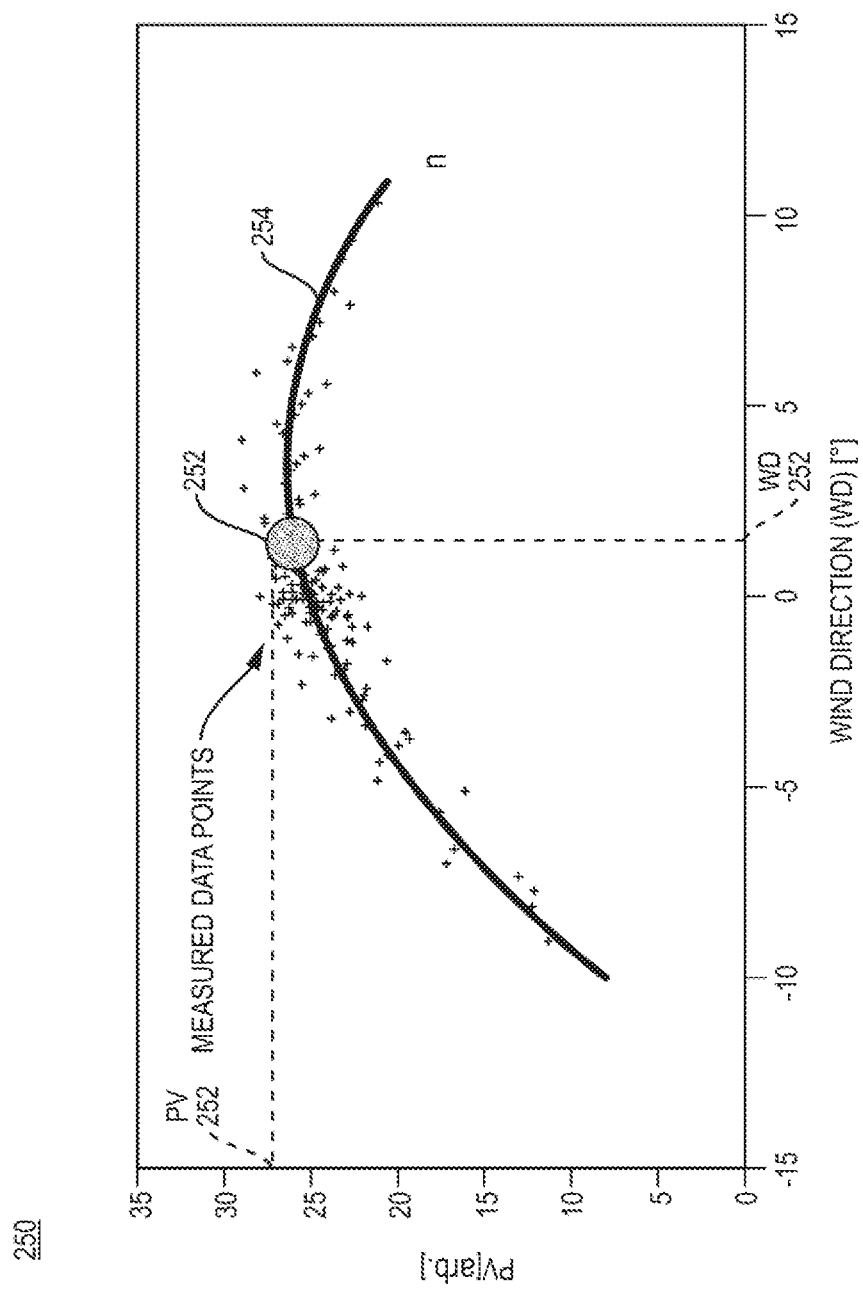
FIG. 9 is a parabola fit plot of performance value data against wind direction angle data over a single mechanical speed range wherein the data is obtained from the bins defined in the matrix of FIG. 8.

In step 124, a parabola fit for optimum wind direction per mechanical speed bin may be performed as depicted in FIG. 9 and as described in more detail in Annex C. In FIG. 9 there is shown a graph 250 which plots data points corresponding to the valid point—triples from matrix 200 of FIG. 8 by performance value (PV) along the y-axis and wind direction (WD) along the x-axis for one mechanical speed bin range. In this example, the data points may correspond to those collected for mechanical speed bin 204, 6-7 rpm. As can be seen there are many individual data points, e.g. data point 252, which is plotted by its wind direction value, WD252, and its calculated performance value, PV252. All of the valid point triples for the mechanical speed bin range are plotted in a similar way and from the data points a parabola fit is performed to establish curve 254 for that mechanical speed bin range.

Figure 10A:
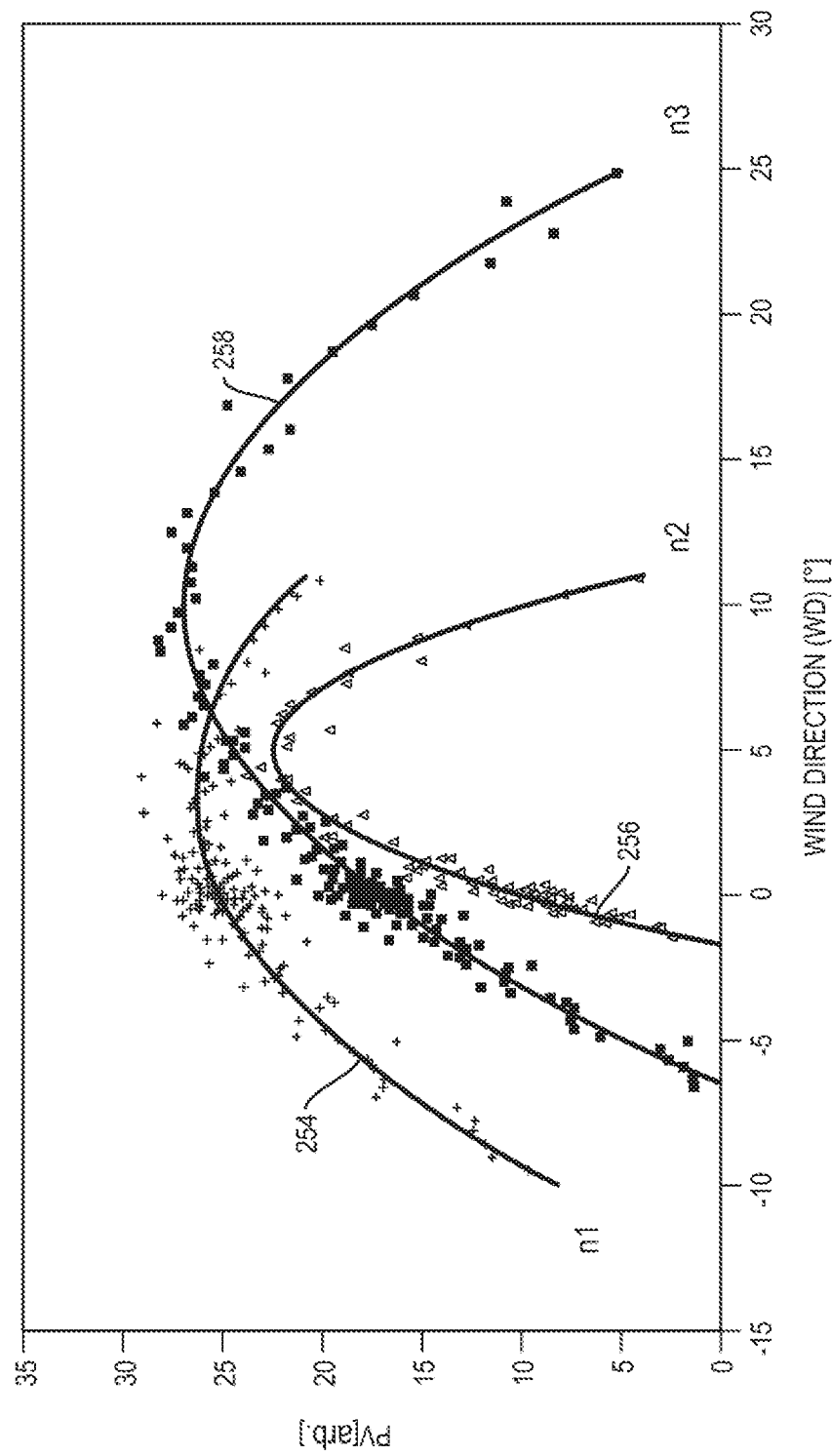
FIG. 10A is a parabola fit plot of performance value data against wind direction angle data over three mechanical speed range sets wherein the data is obtained from the bins defined in the matrix of FIG. 8.

As shown in FIG. 10A, a parabola fit is performed for each set of data points also for the other mechanical speed bin ranges. So, in addition to parabola fit curve 254 there are parabola fit curves 256 for mechanical speed bin 203, 5-6 rpm, and 258 for mechanical speed bin 205, 7-8 rpm superimposed on a single graph. In step 126 of flow chart 100, FIG. 7, it is determined if the parabola fits for each of the mechanical speeds are valid. If they are valid, the system proceeds to step 128 and evaluates the mechanical speed bin curves to determine optimum wind direction for each mechanical speed range, as described with respect to FIG. 10B.

Figure 10B:
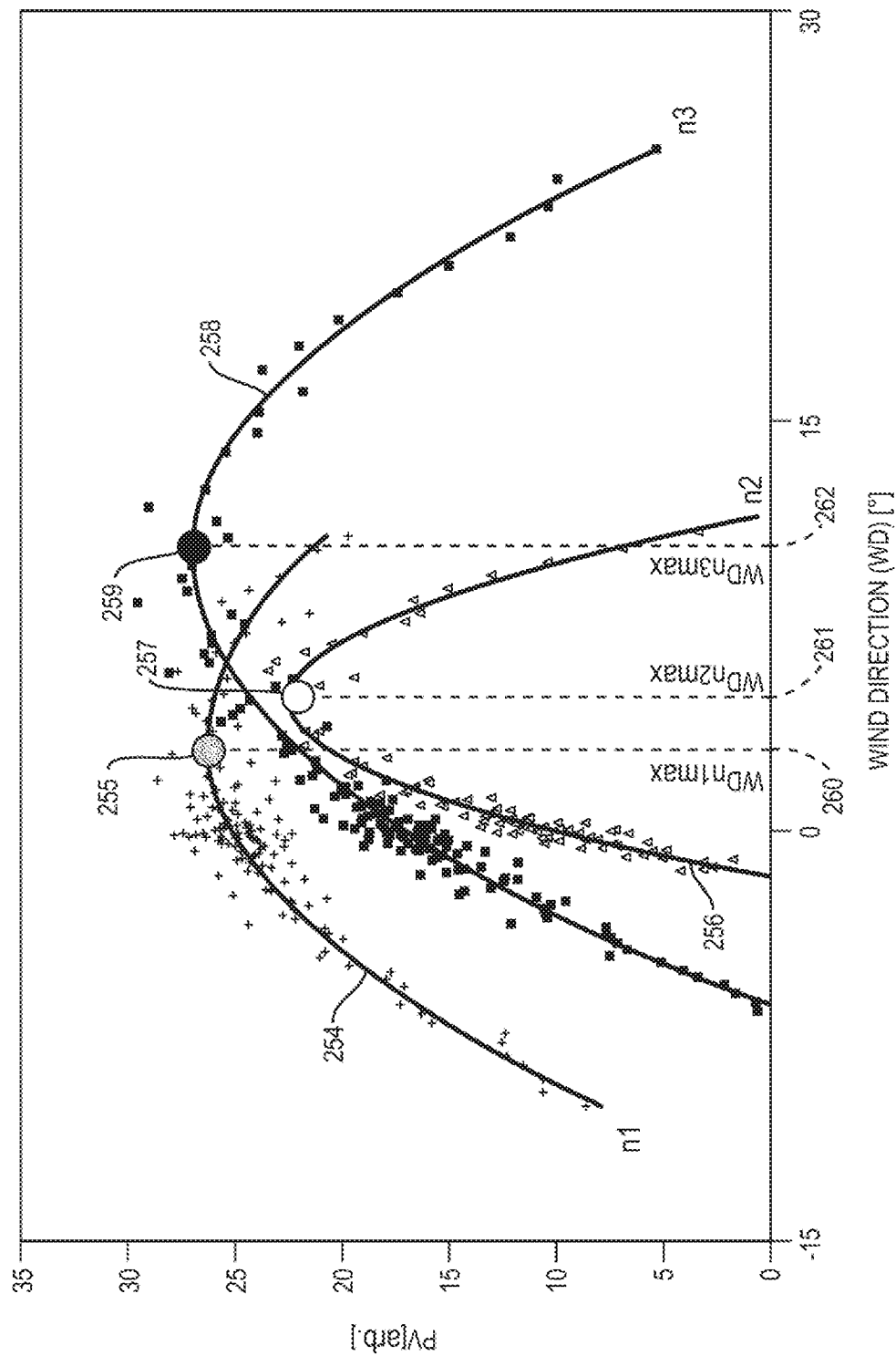
FIG. 10B is the parabola fit plot of performance value data against wind direction angle data of FIG. 10A, with the maxima for each curve identified.

In FIG. 10B, curves 254, 256, and 258 are shown superimposed on a single graph with each curves maximum indicated as 255, 257, and 259, respectively. Each maximum corresponds to a specific wind direction value, which may be referred to as the maximum performance wind direction. For maximum 255 the maximum performance wind direction is indicated at point 260. For maximum 257 the maximum performance wind direction is indicated at point 261. And, for maximum 259 the maximum performance wind direction is indicated at point 262. This approach provides the maximum performance wind direction for each mechanical speed range, i.e. the wind direction which produces a maximum performance value (PV).

Figure 11:
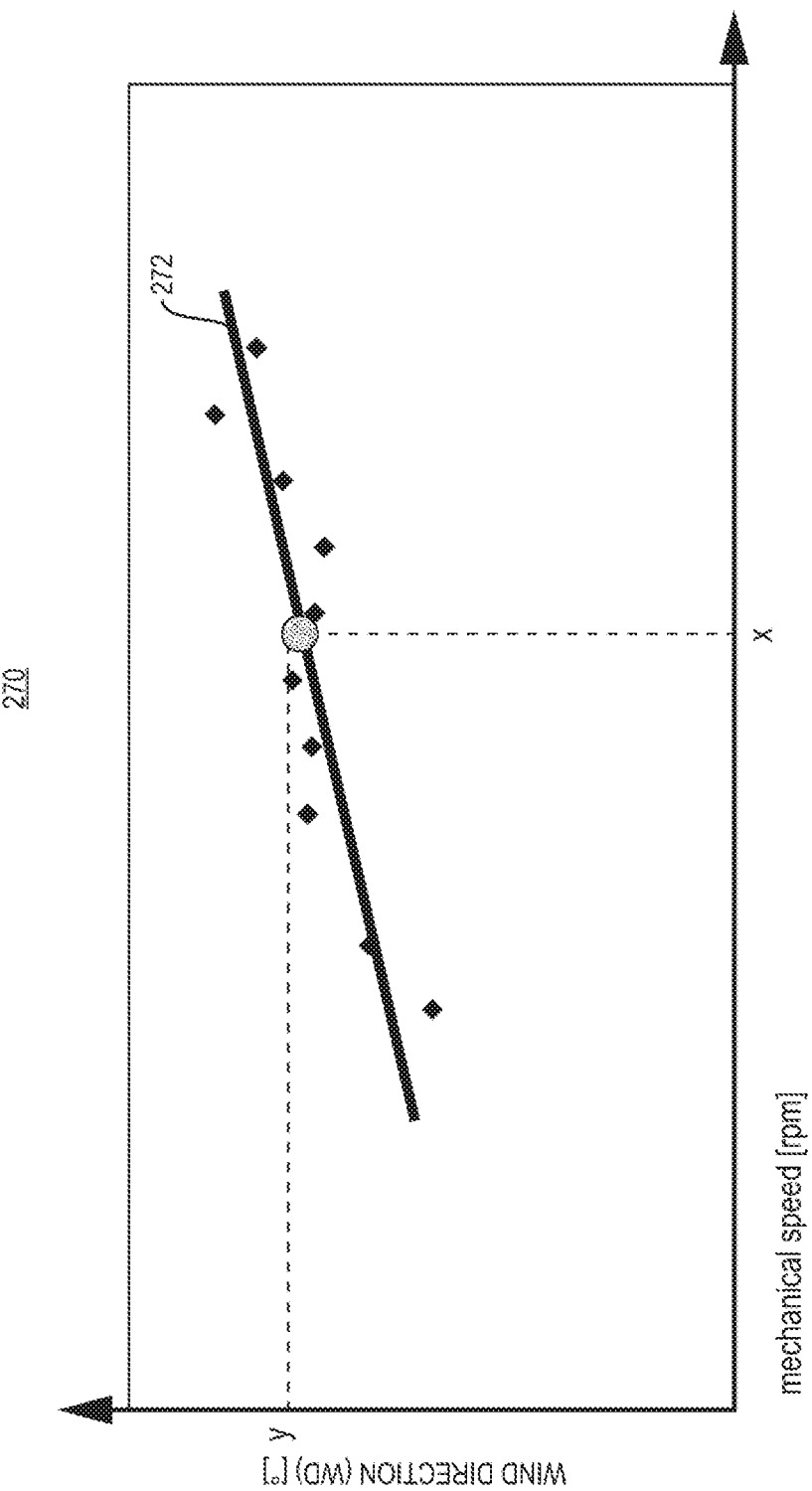
FIG. 11 is a straight line plot of wind direction correction data against rotor speed wherein the data is obtained from the bins defined in matrix of FIG. 8.

With step 130 of flow chart 100, Phase V of the method starts. Phase V performs calculations, evaluations, and parameter and variable settings based on the results obtained in Phases III and IV. In step 130 of flow chart 100, a line fit of the wind direction compensation based on mechanical speed binning is performed and is depicted in FIG. 11 and described below. The method also works on constant speed turbines (or multiple constant speed turbines), because the implementation is done accordingly. The wind direction compensation values determined in step 128 based on performance value evaluation are used to adjust anemometer a by using a functional relation between the wind direction (WD) correction and the mechanical speed.

It is preferred that data be taken on a variable speed turbine for the entirety of a given time period be taken while the variable speed turbine is running in the variable speed range. However, it is not a requirement, and as long as the variable speed turbine is operating in the variable speed range for a portion of the time period, e.g. at least fifty percent of the time period, the data may be considered valid data.

If the turbine is a constant speed type or multiple constant speed type turbine, i.e. constant low rotor speed for low wind speeds and constant high rotor speed for high wind speed), only generator rotational speeds in one or more constant speed(s) is/are valid and may be used. It is preferred that data be taken for the entirety of a given time period while the turbine is running in one or more of the constant speed(s). However, it is not a requirement, and as long as the constant speed turbine is operating one or more of the constant speeds for a portion of the time period, e.g. at least fifty percent of the time period, the data may be considered valid data.

As shown in graph 270, FIG. 11, wherein wind direction (WD) correction maxima points are plotted relative to the mechanical speed and a line fit 272 or adequate fit is formed as indicated in step 130 of flow chart 100, FIG. 7. In step 132 of flow chart 100, an optimum wind direction compensation value may be obtained for anemometer a for each mechanical speed. As an example, when the turbine is operating at X rpm, using line fit 272, the optimal wind direction (WD) compensation Y is obtained and provided to the PLC to adjust the wind direction output of anemometer a. The system then proceeds to step 114 to determine if more anemometers need to be evaluated for the given time period t.

If there are more anemometers, the system performs the same assessment on the other anemometers for time period t data, as described above. Once all anemometer data has been processed and wind direction compensation values determined, the values may be used by the wind turbine PLC, in executing the main yaw control algorithm, to adjust the anemometer wind direction readings to provide more accurate yaw control.

Referring again to step 126 of flow chart 100, if the parabola fit for each of the mechanical speeds is determined to be invalid, instead of proceeding to step 128, the system proceeds step 134 where a line fit of performance value (PV) measurements is established. Sometimes the parabola fit for the performance value data does not open in the downward facing direction as depicted by curve 254, FIG. 9, and instead opens in an upward manner.

Therefore, instead of a parabola fit, in step 134, a line fit may be performed on the data points. The maximum of the line within a certain range of the logged data is then taken as the optimum yaw position. The weighting factor (for details see also Annex C) is in that case reduced to avoid substantial yawing maneuvers based on that very rough estimation. In step 136, the mechanical speed data based on the line fit may be evaluated. From here, the system proceeds to step 130 where the wind direction (WD) correction maxima points may be plotted relative to the rotational speed of the generator as depicted in FIG. 11.

Annex D in more detail describes the calculations involved with the above steps. Annex E describes some possible algorithm alternatives/improvements. Below are described some additional embodiments using the principles of the invention described above.

Additional Embodiments

As described above, a wind direction correction value may be calculated based on a number of time periods for measurements of different turbine variables to be collected. In that process, a number of bins are filled with a certain predefined sufficient number of data points to ensure accurate wind direction correction. The actual number of data points collected to ensure accurate correction is variable and may encompass a range based on a tradeoff between increased accuracy and delay in yaw correction. Before all bins across rotor speed ranges are adequately filled, i.e. each of the bins have not been filled with the predefined number of data points, the according mechanical speed region is considered to not yet be valid. So, it could take a significant amount of time to collect sufficient data across all speed ranges and apply according correction values.

In order to speed up this process, in one aspect of the invention, the correct value for the wind direction correction value may be estimated for a certain mechanical speed region, i.e. a certain bin, without having sufficiently filled that bin. This estimation could be done on the basis of other already filled bins, using any kind of extrapolation, for example linear extrapolation. This strategy can speed up the process of getting wind direction correction values, and can thus increase the energy output of the turbine. This extrapolated correction values are then used as long as better values are not available to be used in the standard approach described above and as depicted in FIG. 11.

Figure 12:
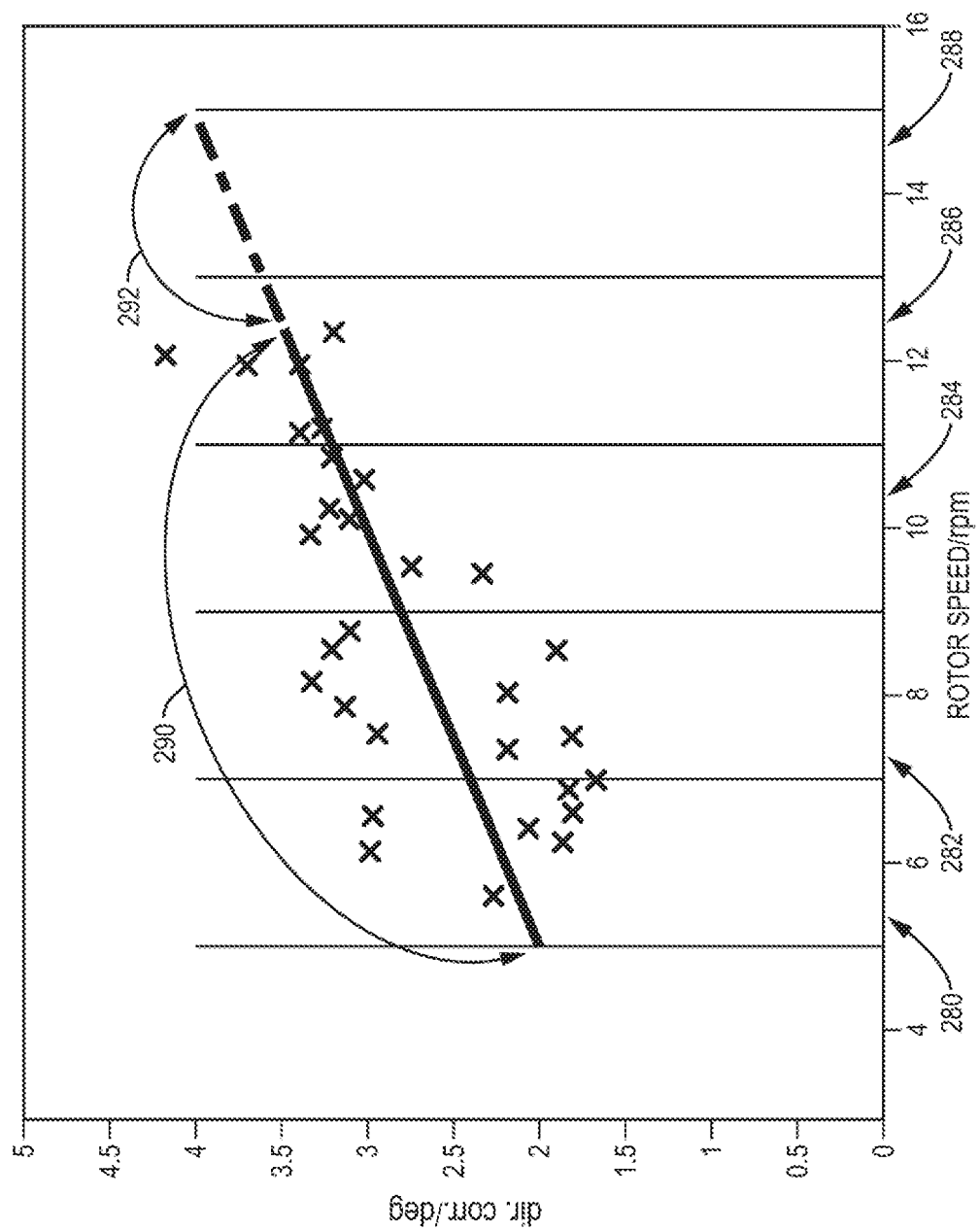
FIG. 12 is a straight line plot of wind direction correction data against rotor speed wherein a portion of the plot is extrapolated.

This extrapolation approach is depicted in FIG. 12. This figure is comparable to FIG. 11 where rotor speed is plotted along the X axis and wind direction correction angles are plotted along the Y axis. The wind direction correction maxima points across binned rotor speed ranges 280 (5-7 rpm), 282 (7-9 rpm), 284 (9-11 rpm), and 286 (11-13 rpm) are depicted by "x" marks. There are a sufficient number of wind direction correction maxima points that have been collected and plotted across these bins and a line fit plot, as shown in a solid line, has been plotted using the standard algorithmic approach described above. What is different here is that there have been no wind direction correction maxima points that have been collected and plotted for bin 288 (13-15 rpm).

With the standard algorithm described above, the line fit may not be determined until sufficient data points have been collected and included in bin 288. Alternatively, a line fit 290 across bins 280, 282, 284, and 286 may be established and then the extrapolated line fit 292 for bin 288 may be applied. While as long as there is one bin with a valid number of wind direction correction maxima points, the line fit for the other bins may be extrapolated.

As described above, the algorithm described herein uses mechanical speed binning in order to calculate wind direction compensation values. In most types of wind turbines, a turbine operating point not only depends on the mechanical speed, but also on other parameters, like the turbine power. This is mostly due to the fact, that the mechanical speed range of the turbine in power production is limited by the design of the turbine. That means that there exist speed values (speed limit values), where the turbine keeps its mechanical speed constant, but still can change its operation point by changing the produced power.

Figure 13:
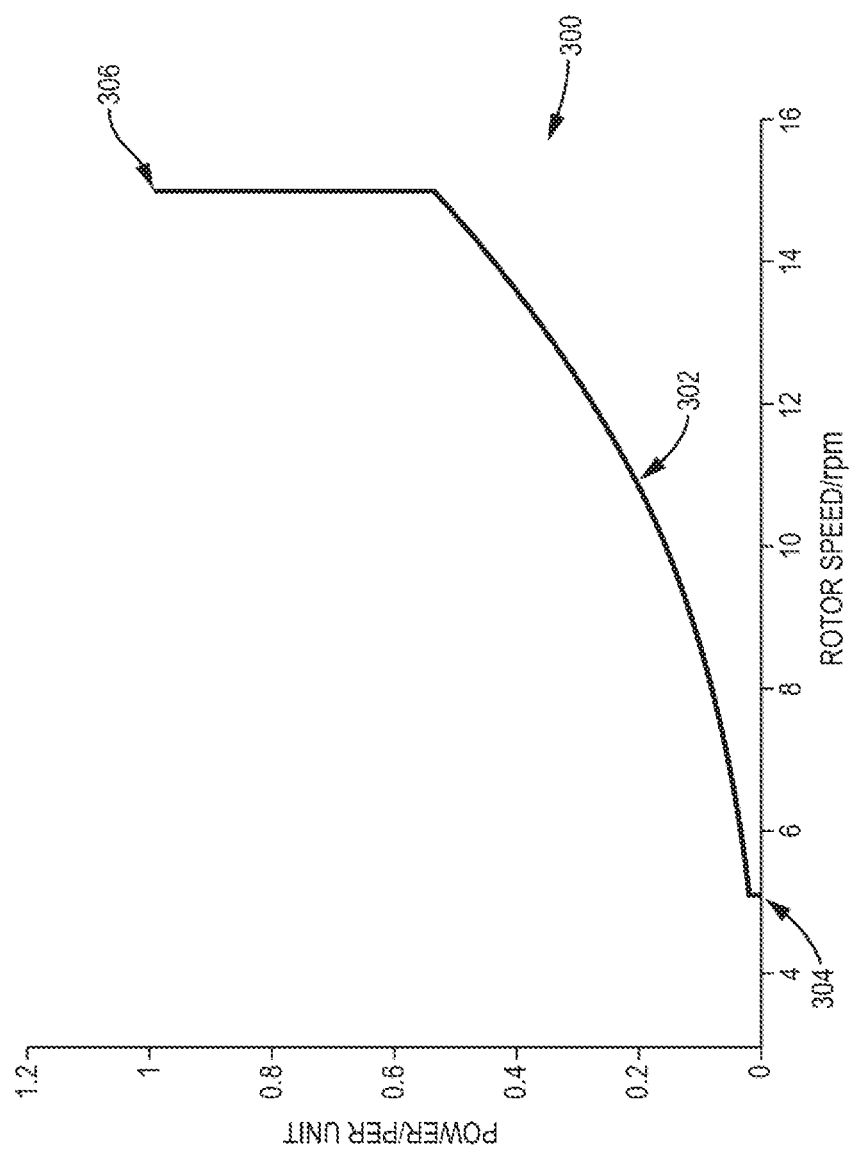
FIG. 13 is a plot of wind turbine rotor speed (rpm) for a variable speed wind turbine against wind turbine power.

In FIG. 13 there is shown such an operation dependency. In such speed limit operating regions, the algorithm so far described would deliver only one single value for the wind direction correction (see FIG. 11). However, a wind direction correction value dependent on the operating point at limit speeds would bring the advantage of improving the accuracy of the wind direction correction. So, in another aspect of the invention, the algorithm not only uses mechanical speed binning, but also performs a power binning, when the turbine works at one of its possibly multiple mechanical speed limit values.

In FIG. 13 there is shown power curve 300 across the range of wind turbine rotor speeds. As long as the rotor speed varies, such as along variable speed curve portion 302 (from above 5 rpm to just below 15 rpm). This is because as the rotor speed changes, so does the power output of the turbine and there is a clear correlation between rotor speed and power output. And, the wind direction correction may be calculated based on the above described mechanical speed binning, as shown in FIG. 11 and FIG. 12. When the mechanical speed of the turbine reaches its limits, such as at the low speed end of the curve at 304 (5 rpm) and at the upper speed end of the curve at 306 (at 15 rpm), the rotor speed is fixed, but the power output varies at the fixed rotor speeds. In this region, mechanical speed binning alone cannot differentiate between different power outputs at these fixed speeds and therefore cannot accurately determine a wind direction correction value in these cases. To overcome this, power binning is applied to determine accurate wind direction correction values in these fixed speed ranges.

Figure 14:
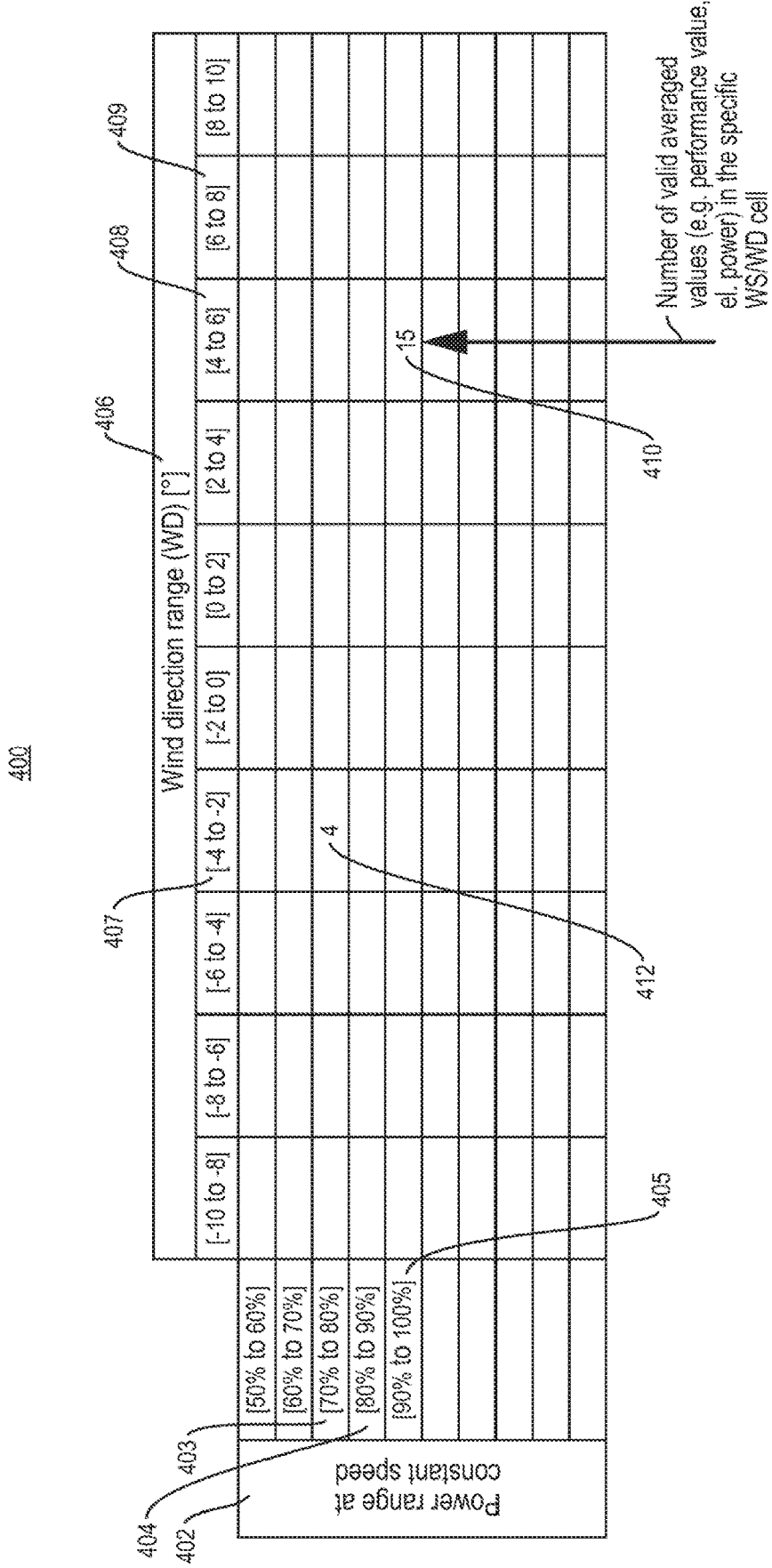
FIG. 14 is a turbine power range/wind direction binning matrix according to an aspect of this invention.

Referring to FIG. 14, power binning table 400 is shown having a number of power bins, each bin having turbine power range which is used only when the turbine is operating at its upper speed end, such as at 306 (at 15 rpm) in FIG. 13. Rotor speed does not change in this region but power output does and it can be used to determine wind direction correction using power binning. Along the first column 402 of table 400, turbine power ranges from 50-100%, which are the power levels of the turbine when operating at the upper speed. For example, bin 403 is designated as having a power range of 70-80% of rated turbine power, while bin 404 is designated as having a power range of 80-90% of rated power. And, bin 405 is designated as having a power range of 90-100% of rated power. Across the top row 406 are wind direction correction bins (WDj), each bin having a wind direction range, e.g. (−4)-(−2) degrees (407), (+4)-(+6) degrees (408), (+6)-(+8) degrees (409). Various numbers of bins and ranges of power may be used depending on the particular wind turbine and siting of the turbine.

Continuing to refer to power binning table 400 of FIG. 14, in bin 410, for example, there is shown the number "15" which indicates that in the according bin there are fifteen averaged valid point—triples which had an average wind direction correction in the 4 to 6 degrees range. In bin 412 there is the number "4" which indicates that over the same period of time only four averaged valid point—triples which had an average wind direction correction in the −4 to −2 degrees range had been saved. From this data, the wind direction correction values for various power levels are determined and plotted as will be depicted in FIG. 15

Figure 15:
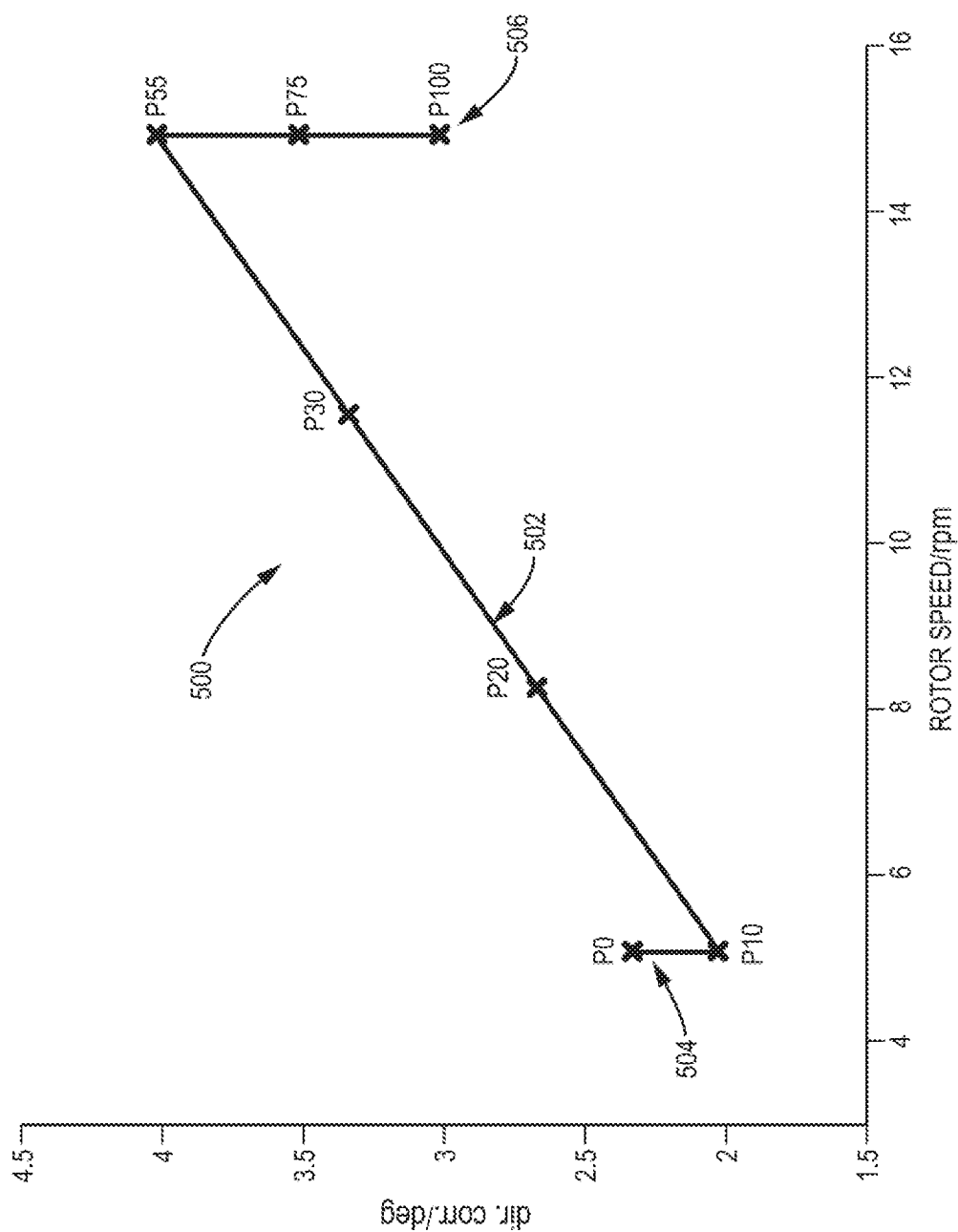
FIG. 15 is a plot of wind turbine rotor speed (rpm) for a variable speed wind turbine against wind direction correction angles with wind turbine power points superimposed thereon.

So, at the mechanical speed limits, points 304 and 306 on curve 300, FIG. 13, different wind direction correction values are calculated, depending on the operating power of the turbine. In FIG. 15, rotor speed is plotted against wind direction correction angle as line 500. In the variable speed range 502 from just above 5 rpm to just below 15 rpm there is a linear relation between rotor speed and wind direction correction angle and wind direction correction values are discernable as rotor speed changes in this range. However, in the lower fixed speed region 504 the rotor speed is fixed yet the wind direction correction angle changes as does the power output of the wind turbine. The same is true in region 506, which is the upper end fixed speed of 15 rpm.

In order to improve the accuracy of the wind direction correction angle in regions 504 and 506, turbine power output is superimposed on the plot as points P0, P10, P20, P30, P55, P75, and P100, representing the percent of full rated turbine power values at each point. Thus, knowing power values more effective/accurate wind direction correction angles can be discerned in the fixed speed operating regions. In operating region 506, while the rotor rpm is fixed, by knowing the power output of the turbine the correct wind direction correction angles can be determined. For example, at P55 (55% of rated power) the wind direction correction angle is 4 degrees, while at P75 and P100 the wind direction correction angles are 3.5 and 3 degrees, respectively. As seen in FIG. 15, the wind direction correction may in certain turbines decrease with increasing turbine power.

While this method is described with respect to a variable speed wind turbine it may also be applied in the same way to constant or fixed speed wind turbines.

One further aspect of the invention generalizes the idea of using speed binning combined with power binning. In this generalization, the binning process is extended from one variable (i.e mechanical turbine speed) to more variables (in general any number higher than one, but at least two). Such an additional binning variable could exemplarily be the turbine power, but also any other available turbine variable. In other words, the binning dimension may be extended from one to more than one.

One way to implement this idea is described as follows. In the data grouping process (i.e. the binning process) of the measurement data, which is the first step in the algorithm (as has been previously described above) there may be implemented a pre-sorting of the data. Instead of binning every collected measurement data point in the way described before (binning into mechanical speed regions and filling up a matrix like shown in FIG. 8), the data may be pre-sorted depending on the measured average power related to the measurement points and collected in different power groups. In order to do this, power regions (for example in steps of 10% of rated power) may be first defined. A new way to analyze measurement data point may first be analyzed for its power and assigned accordingly to the correct power region binning matrix/table. Within the respective power table, the process of data binning (mechanical speed binning) may then subsequently be done in the same manner as already described above. So, a multiple number of matrices/tables like in FIG. 8 may be formed.

These matrices may be distinguished by different power regions, as is shown in FIG. 16. For example, matrices 600a for the power turbine power region of 0-10%, 600b for the turbine power region of 10-20%, 600c-600i (not shown) for turbine power regions between 20-90%, and finally 600j for turbine power region 90-100%. For each of these matrices, the further analysis is done in the manner described above with regard to FIG. 8 by binning data according to mechanical speed wind direction range. In the end, the method delivers a wind direction correction data set not only dependent onto the mechanical speed (FIG. 8), also not only dependent on exclusively either the mechanical speed or the power (depending on the operating point, as shown in FIG. 15), but dependent on both the mechanical speed and the power in parallel.

Since there are now two binning variables instead of one, this approach may be referred to as a 2-dimensional data or binning analysis. As can be seen in FIGS. 16A-C, the matrices are independent of each other and are populated with valid data point triples which may vary from matrix to matrix. In the matrix for 0-10% power there are 4 valid data point triples in the mechanical speed range of 5-6 rpm and wind direction of −4 to −2 degrees bin. There are 15 valid data point triples in the 7-8 rpm and 4-6 degree bin. In the 10-20% power matrix there are 2, 7 and 18 triples in various bins and in the 90-100% power matrix there are shown 5 and 18 valid data point triples in respective bins.

With the two-dimensional binning approach, the final calculation of the correct wind direction correction value, that is sent to the PLC in the end, could be—like in the one dimensional case—the result of a data fitting as described in detail above. In the 2-dimensional case it would be done with 2-dimensional fitting, and it could be a linear one or any other fitting that one skilled in the art would deem to be adequate.

Figure 17:
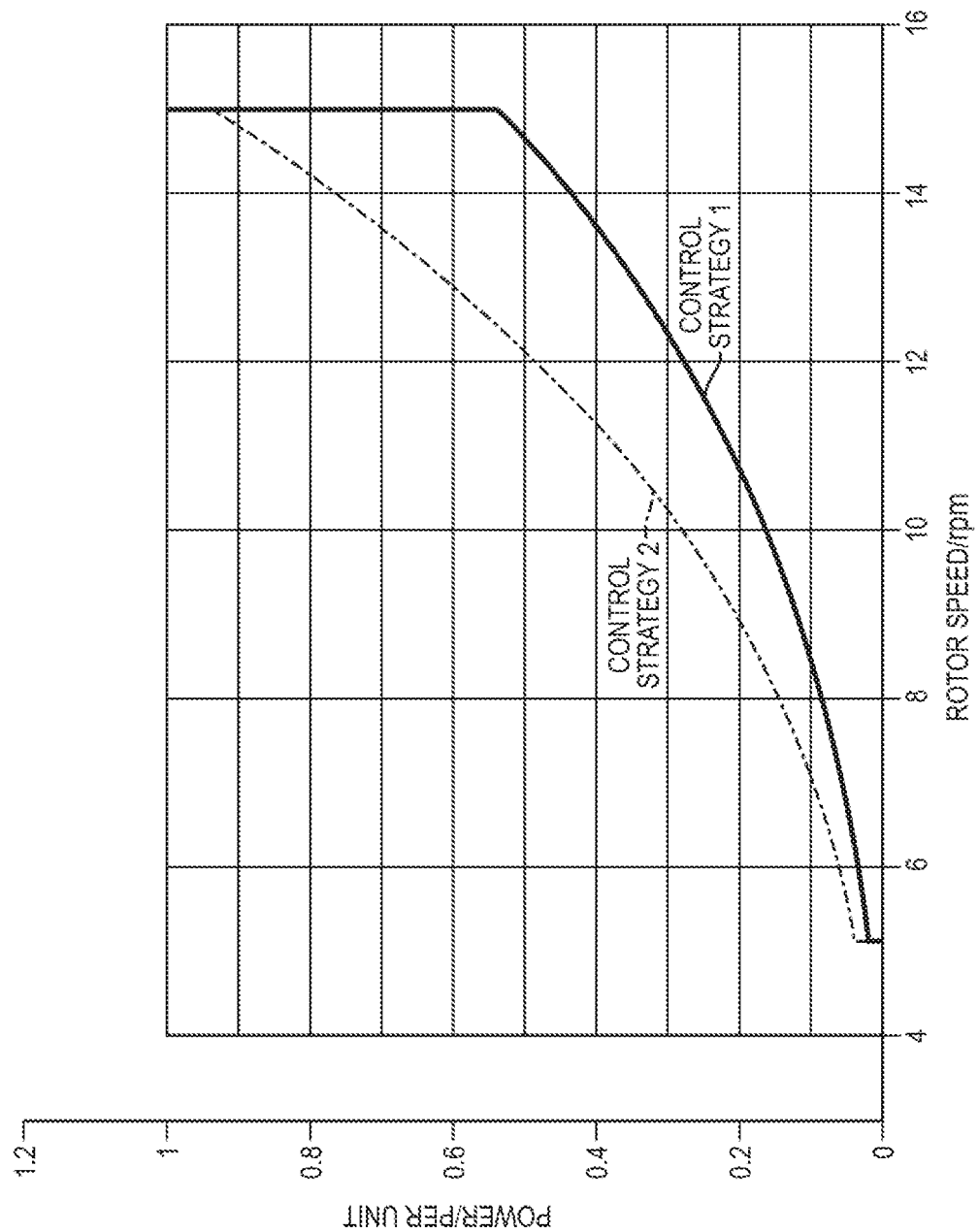
FIG. 17 is a plot of wind turbine rotor speed (rpm) for a variable speed wind turbine against wind turbine power wherein curves for two different control strategies are depicted.

This two dimensional data or binning analysis has some consequences. A disadvantage is that by these additional binning dimensions the number of bins generally increases substantially and the process of data collection for achieving validity of the bins will hence take a longer time. So it will take longer until the turbine performs a good wind direction compensation. On the other hand, such an extension of the binning dimension from one to two or more not only improves the final accuracy, but also provides a significant further advantage. Principal operation changes in the turbine control (e.g. changing of the usually implemented torque to speed relation in variable speed turbines) are quickly considered and after having filled the according bins, the correct wind direction correction can be realized very fast at such principal operational changes. Such intended principal operational changes can occur if turbines are exposed to special environmental conditions (example high altitude) or special general regulations (intended speed reduction in order to decrease noise). Shown in FIG. 17 are 2 example wind turbine control curves which may be implemented using two-dimensional binning. The first curve shown by the solid line may be the original control curve and the second curve (in dotted line) may be the newly implemented control curve obtained from the data from the two dimensional binning process over time. It is visible, that depending on the used turbine control curve, different bins will be filled with data.

In one additional embodiment, instead of binning according to mechanical speed, the turbine output power may be used. The same principles used for mechanical speed binning may be applied to turbine output power and the approach described above with regard to mechanical speed binning, depicted in FIGS. 7-11 and described above, would be the same and the parameter of mechanical speed would simply be replaced by turbine output power. To generalize the principle of the invention, the binning process may be referred to as binning using an operational parameter of the wind turbine, which could be one or more of binning by rotor speed/generator speed (i.e. mechanical speed) or by turbine power. This would not include binning by wind speed ranges, as this is not an operational parameter of the wind turbine but, an external parameter, which does, of course, influence the operation of the wind turbine.

While the foregoing description of the invention enables one of ordinary skill to make and use what is considered presently to be the best mode thereof, those of ordinary skill will understand and appreciate the existence of variations, combinations, and equivalents of the specific embodiments and examples herein. The above-described embodiments of the present invention are intended to be examples only. Alterations, modifications and variations may be effected to the particular embodiments by those of skill in the art without departing from the scope of the invention, which is defined solely by the claims appended hereto. The invention is therefore not limited by the above described embodiments and examples.

Having described the invention, and a preferred embodiment thereof, what is claimed as new and secured by letters patent is set forth below after the Annexes.

Annex A—Parameters

TABLE 1

Input Channels from the Wind Turbine Generator PLC

| Variable | Description |
| --- | --- |
| time | PLC time |
| wind speed X | Wind speed signal of anemometer X. Uncompensated wind speed is preferred, but the algorithm works with the compensated values as well. Wind speed signals shall be provided for all anemometers. |
| wind direction X | Wind direction signal of anemometer X. Raw wind direction is preferred, but the algorithm works with the uncompensated or compensated values as well. Wind direction signals shall be provided for all anemometers if available. |
| anemometer status X | Status of anemometer X for measurement validity. Validity flag shall be provided for each anemometer separately if possible. |
| power | Measured electric active power |
| generator speed | Measured generator speed |
| power curve validity | Validity flag of the power curve Can be omitted if weighting factor is calculated based on "$k_{opt}$" measurement |
| ambient temperature | Optional. Used for air density compensation. |

TABLE 2

Iteration Parameters

| Parameter | Description | Suggested/examplary Value |
| --- | --- | --- |
| ws_start | Minimum wind speed for auto calibration algorithm | cut-in wind speed |
| ws_stop | Maximum wind speed for auto calibration algorithm | >~1.2 * rated wind speed |
| gs_step | Binning width for mechanical speed | 0.5 rpm |
| gs_start | Binning start for mechanical speed | 0.5 rpm |
| gs_stop | Binning stop for mechanical speed | 15 rpm |
| wdir_min | Minimum uncompensated wind direction for direction binning | −30° |
| wdir_max | Maximum uncompensated wind direction for direction binning | +30° |
| wdir_step | Binning width for wind direction | 1° |
| forgetting_rate | Ratio to reduce saved weighting factors in each iteration step | 0.00035 |
| ratio_kopt_init | Initialisation value for $k_{opt}$ weighting factor (optimum torque/speed relation factor) | 0.1 |
| pow_min | Minimum active power to start Yaw Autocalibration counting algorithm | 50 kW |

TABLE 3

Turbine Parameters

| Parameter Name | Description |
| --- | --- |
| GenSpeMin | Minimum generator speed |
| GenSpeRat | Rated generator speed |
| nr_Ane | Number of anemometers. |
| altitude | Optional. Height above MSL. Used for air density compensation. |

TABLE 3-continued

Turbine Parameters

| Parameter Name | Description |
| --- | --- |
| wdir_offset_X | Optional. Wind direction offset defined for anemometer X. |
| wdir_cps_sca | Optional. Original wind direction compensation based on generator speed. |

TABLE 4

Internal Variables

| Variable Name PLC Code Name | Type | Description |
| --- | --- | --- |
| gs_vector | Vector of length (m) | Mechanical Speed Vector used for binning. The length of gs_vector is defined by the parameters gs_start, gs_stop and gs_step. The length of the wind speed vector is further on referred to as "m". |

TABLE 4-continued

Internal Variables

| Variable Name PLC Code Name | Type | Description |
|---|---|---|
| wdir_vector | Vector of length (n) | Wind direction vector used for binning. The length of wdir_vector is defined by the parameters wdir_start, wdir_stop and wdir_step. The length of the wind direction vector is further on referred to as "n". |
| counts_ane_X | Matrix of size (m × n) | (m × n) matrix of data counts for anemometer X |
| pv_X | Matrix of size (m × n) | (m × n) matrix of performance values for anemometer X |
| opt_wdir_X | Vector of length (m) | Vector of length m containing the optimum wind direction per mechanical speed bin. |
| ws_X | Vector of length (m) | Vector of length m containing the wind speed per mechanical speed bin. |
| power_X | Vector of length (m) | Vector of length m containing the measured power per mechanical speed bin. |
| kopt_X | Vector of length (m) | Vector of length m containing the measured $k_{opt}$ values per mechanical speed bin. |
| weighting_factor_X | Vector of length (m) | Vector of length m containing the weighting factor per mechanical speed bin. |
| index_mechanical_speed_valid_X | Vector of length (m) | Vector containing the indices of the valid mechanical speed entries |
| weighting_factor_complete_X | Value | Sum of weighting factors for anemometer X To be initialized with 1 at the start of the algorithm. |

In the following table, each variable containing "X" must be maintained for each anemometer separately. "m" is the length of the wind speed vector and "n" is the length of the wind direction Annex B—Data Evaluation Equations Here, details of sub steps 120b-120g of step 120 are described.

In sub-step 120b, a performance value pv is calculated as indicated in Eq. 1 below. The performance value is one criterion to quantify the power performance as a function of measured wind direction within the yaw auto-calibration algorithm described herein.

$$pv = \frac{P}{v_a^{3 \cdot q_v}} \quad == -(\text{Eq. 1})$$

In one possible realization, if the air density is available, Eq. 1 can be adapted in the following, more accurate way:

$$pv = \frac{P}{\rho \cdot v_a^{3 \cdot q_v}} \quad (\text{Eq. 2})$$

pv . . . Performance Value
ρ . . . Air density
P . . . Measured electric power
$v_a$ . . . Measured wind speed of anemometer a
$q_v$ . . . Quality flag for wind speed measurement (binary flag); currently set to standard value 1.

In another realization, systematic effects from a rotating and misaligned rotor onto the wind speed measurement in the rear part of the nacelle of a wind turbine could be considered and using such relations, the wind speed $v_a$, in Eq. 1 could be adapted. This could account for asymmetric wind speed measurement errors, like also described for example in https://www.wind-energ-sci.net/3/395/2018/. There, the wind speed measurement error depending on yaw misalignment is described. Considering such well known systematic effects could further improve the accuracy of the method.

In some cases, the wind speed measurement may cause problems due to uncertainties, bad calibration, local influences or other reasons. As the wind speed is cubed in the performance value calculation of Eq. 1, relatively small variations due to uncertainties etc. may have a large influence. Thus, in some cases it may be necessary to remove the wind speed influence on the performance value by setting the parameter $q_v$ to 0. Normally, however, it is suggested to set parameter $q_v$=1. In case of problems due to the wind speed influence it is recommended to recalibrate the wind speed measurement for better results.

In sub-step 120c, the optimum mode criterion is evaluated. This criterion may further reduce the valid measured data for further calculations and might be omitted. This is particularly the case if the turbine is not a variable speed type. The compensation of yaw misalignment is evaluated while the turbine is operated on maximum power factor $c_p$, i.e. between minimum and rated generator speed, excluding both speed limits. If the turbine data is evaluated on a live basis, a simple "Optimum Mode Ratio" can be calculated that will contain the relative operating time in Optimum Mode:

$$r_{opt} = \frac{10 \text{ min} - t_{minspeed} - t_{ratedspeed}}{10 \text{ min}} \quad (\text{Eq. 3})$$

$r_{opt}$ . . . Optimum Mode Ratio (a chosen interval length can also be different from 10 min)
$t_{minspeed}$ . . . Time spent close to or below minimum generator speed during a 10 min interval
$t_{ratedspeed}$ . . . Time spent close to or above rated generator speed during a 10 min interval In an alternative method, instead of estimating or calculating the time ratio the turbine was producing at $k_{opt}$ (optimum mode gain) during the last 10 min interval, this method first measures the actual $k_{opt}$ the turbine is operated at. Based on that measured and constantly updated value the weighting factor $r_{opt}$ for the last 10 min interval is calculated.

Using the Optimum Mode Ratio $r_{opt}$, an Optimum Mode Criterion may be made and further on be used in improving the accuracy of the wind direction compensation. However, this sub step is not mandatory for the invention.

Counting and Filtering.

All counted values should be treated in a way, so that their influence to the results of the wind direction compensation decreases with time compared to newer acquired data. Different methods for this sub task are possible, e.g. PT1 filtering of the data using a suitable time constant. Another possible and similar way is to decrease the weight of data acquired in older steps. A parameter associated with the latter is referred to in Annex A as "forgetting rate".

Such a filtering is applied to different values, including the Performance Value, measured electric Power, generator speed, etc.

Basic Data Evaluations.

It is clear to accept only the matrix elements with count numbers bigger than 0 for evaluation. After one e.g. 10 minute averaged data point was collected in element [i, j] of the pv matrix, row [i] is evaluated for valid indices, which are the columns of row i with count number bigger than zero.

In sub-step 120f wind speed and wind direction statistics for the mechanical speed bins are determined.

The measured data is only-evaluated at this point if:
The sum of counts in the according mechanical speed bin is bigger than the demanded minimum count.
The range of logged wind directions is equal or bigger than the demanded minimum range.
The number of mechanical speed bins containing data is sufficiently high.

If one of the above criteria fails, the evaluation for anemometer a of the last e.g. 10 min interval is stopped after the logging of the performance value, power and counts data.

In sub-step 120g, the counters are incremented.

Annex C—Parabola Fit

The basic equations for curve fitting (including parabola fitting) are not discussed here, since they can be easily found in literature. Several stages of the invention discussed here use these standard methods in either its general form, or, alternatively, slightly modified. Modifications include the possibility of weighting the data set in different manners based on different criteria, like e.g. the reduction of the weight for older data points. Another possible weighting criteria could be the distance of the considered data point to the expected optimum wind direction angle (data points far away from the expected optimum could exemplarily be underweighted). Also modifications like minimizing perpendicular offsets instead of minimizing of squares of vertical offsets are a possible modification. Even different curve fittings may be applied e.g. sin function, cos function, polynomial function.

So, the fitting methods used are not limited to standard curve fitting, but can also be done using other criteria. All such modifications to standard curve fitting are possible. In fact, the preferred method in a practical realization of the invention is the different weighting of the data points.

In step 124, a—possibly modified—parabola fit for Optimum Wind Direction per mechanical speed bin is performed. From the result, the optimum wind direction in each mechanical speed bin may be determined. The optimum wind direction is only accepted within a certain range of the measured data.

Annex D—Evaluation of Parabola Fit Results

If the parabola fit from Annex C results in an inverse parabola (open at the top instead of open at the bottom), then a linear fit may be performed with the according data. As optimum wind direction value, one of the end values of the predefined range is taken e.g. where the corresponding PV value is bigger. A relatively small weighting factor for the result is chosen in order to underweight the data point. The reason is, that results obtained from linear fits are assumed to have bigger uncertainties than results obtained from parabola fits, and therefore have to be underweighted.

Evaluation of Wind Direction Compensation:

The Wind direction compensation (Phase V in FIG. 7) is the last step of the algorithm.

The compensation parameters for anemometer X are finally derived via a line fit of optimum wind direction over generator speed. The fit is weighted by the calculated weighting factors. To do so, the optimum wind direction depending on the mechanical speed first has to be evaluated with the parabola fit (alternatively linear fit or different) described above. Afterwards, the resulted values are linearly fitted (or adequately) in dependence of the generator speed. In order to avoid unsteady behavior of the algorithm, values are filtered using a suitable method (described above).

Annex E—Possible Algorithm Improvements

Possible algorithm improvements which are not described up to now could be:
Measurement Range Optimization→ Range shifting if necessary
Possibly, the algorithm could be applied to the pure power signal as well (i.e. not only on the performance value signal). Wind measurement could cause problems on some turbines:
Less power production because of yaw misalignment→ less duct (nozzle) effect→ less wind measurement could lead to higher pv values because of $pv \sim 1/v^3$. The result of this effect is the above mentioned inverse parabola (parabola opened at the top). However, since the effect could be considered to be symmetric (relatively to left and right yaw misalignments), the algorithm should still find the optimum yaw direction correction.
Less power production because of yaw misalignment→ less extracted power→ more wind measurement would be ok
"History Mode": Make algorithm faster by initialization based on evaluation of historic logged data (if available).
Analysis of directional sectors: By applying the algorithm for different geographic inflow sectors separately, terrain and wake effects could be accounted for.
Disadvantage: Longer "warm-up time" of the algorithm. Could be compensated by shared results for all sectors until sufficient amount of data is available.

What is claimed is:

1. A yaw auto-calibration method configured to calibrate at least one anemometer of a yaw control system to correct for yaw misalignment, the yaw control system configured to adjust a wind turbine nacelle position about a yaw axis to align the wind turbine with the direction of the wind inflow, the yaw auto-calibration method comprising:
collecting wind turbine data over a plurality of time periods with respect to the at least one anemometer, the wind turbine data including one or more of mechanical speed, wind speed, turbine power, and wind direction;
determining from the collected data a wind direction compensation signal associated with a plurality of operational parameter ranges; the wind direction compensation signals corresponding to the effects on the at least one anemometer due to yaw misalignment;
providing the wind compensation signals to the yaw control system to adjust the wind direction data of the at least one anemometer for each of the associated operational parameter ranges;
wherein the step of collecting includes calculating an average operational parameter and an average wind direction for each time period of the plurality of time periods for the at least one anemometer and binning the average operational parameter and average wind direction for each time period in a bin location based on a range of operational parameters and a range of wind directions;

wherein a performance value correlated to the average power of the electrical generator and the average wind speed is calculated for each time period and is associated with the binned average operational parameter and average wind direction for that time period; and wherein the step of determining a wind direction compensation signal associated with an operational parameter range includes plotting for each operational parameter range a performance value calculated over the plurality of time periods against its corresponding average wind direction.

2. The yaw auto-calibration method according to claim 1 wherein the operational parameter includes one or more of rotor speed, generator speed and turbine power.

3. The yaw auto-calibration method according to claim 1 wherein the step of determining a wind direction compensation signal associated with an operational parameter range further includes determining from the plotted performance value, a maximum performance value for each operational parameter range, and wherein the step of determining also includes plotting the wind direction compensation signal associated with each said maximum performance value relative to the associated operational parameter range.

4. The yaw auto-calibration method according to claim 3 wherein the step of providing the wind direction compensation signals to the yaw control system includes providing the plotted wind direction compensation signals associated with each said maximum performance value relative to the associated operational parameter range to the yaw control system.

5. The yaw auto-calibration method according to claim 3 wherein the wind turbine is a variable speed wind turbine having a variable speed range, and wherein the average operational parameter is determined only when said variable speed turbine is operating in said variable speed range for at least a portion of the time period.

6. The yaw auto-calibration method according to claim 3 wherein the wind turbine is a fixed speed wind turbine having at least one speed operating point with substantially no speed variability at said at least one operating point and wherein the average operational parameter is determined for a time period only when the fixed speed turbine has operated at said at least one speed operating point during at least a portion of the time period.

7. The yaw auto-calibration method according to claim 3, wherein the step of plotting the wind direction compensation signals includes extrapolating the wind direction compensation signals for at least one operational parameter range.

8. The yaw auto-calibration method according to claim 3, wherein plotting the wind direction compensation signal associated with each said maximum performance value relative to the associated operational parameter range the associated operational parameter range includes plotting the wind direction compensation signal relative to one of rotor speed or generator speed and adjusting the wind direction signal based on the measured turbine power.

9. The yaw auto-calibration method according to claim 1, wherein the step of binning the average operational parameter and average wind direction for each time period in a bin location based on a range of operational parameters and a range of wind directions includes using two dimensional binning wherein there are a plurality of bin matrixes, each matrix corresponding to a different range of a first operational parameter and each matrix including a range of a second operational parameter relative to the range of wind directions.

10. A yaw auto-calibration system configured to calibrate at least one anemometer of a yaw control system to correct for yaw misalignment, the yaw control system configured to adjust a wind turbine nacelle position about a yaw axis to align the wind turbine with the direction of the wind inflow, the yaw auto-calibration system comprising:

a collection module for obtaining wind turbine data over a plurality of time periods with respect to the at least one anemometer, the wind turbine data including one or more of mechanical speed, wind speed, turbine power, and wind direction;

a calculation module for determining from the collected data a wind direction compensation signal associated with a plurality of operational parameter ranges; the wind direction compensation signals corresponding to the effects on the at least one anemometer due to yaw misalignment;

a transfer module configured to provide the wind direction compensation signals to the yaw control system to adjust the wind direction data of the at least one anemometer for each of the associated operational parameter ranges;

wherein the collection module is configured to calculate an average operational parameter and an average wind direction for each time period of the plurality of time periods for the at least one anemometer and to bin the average operational parameter and average wind direction for each time period in a bin location based on a range of operational parameters and a range of wind directions.

11. The yaw auto-calibration system according to claim 10 wherein the operational parameter includes one or more of rotor speed, generator speed and turbine power.

12. The yaw auto-calibration system according to claim 11 wherein the calculation module is configured to calculate a performance value correlated to the average power of the electrical generator and the average wind speed for each time period and is associated with the binned average operational parameter and average wind direction for that time period.

13. The yaw auto-calibration system according to claim 12 wherein the calculation module is configured to plot for each operational parameter range a performance value calculated over the plurality of time periods against its corresponding average wind direction.

14. The yaw auto-calibration system according to claim 13 wherein the calculation module is configured to determine from the plotted performance value, a maximum performance value for each operational parameter range and to plot the wind direction compensation signal associated with each said maximum performance value relative to the associated operational parameter range.

15. The yaw auto-calibration system according to claim 14 wherein the transfer module is further configured to provide the plotted wind direction compensation signals associated with each said maximum performance value relative to the associated operational parameter range to the yaw control system.

16. The yaw auto-calibration system according to claim 14 wherein the wind turbine is a variable speed wind turbine having a variable speed range, and wherein the average operational parameter is determined only when said variable speed turbine is operating in said variable speed range for at least a portion of the time period.

17. The yaw auto-calibration system according to claim 14 wherein the wind turbine is a fixed speed wind turbine having at least one speed operating point with substantially no speed variability at said at least one operating point and wherein the average operational parameter is determined for a time period only when the fixed speed turbine has operated at said at least one speed operating point for at least a portion of the time period.

18. The yaw auto-calibration system according to claim 14, wherein the calculation module is configured to extrapolate the wind direction compensation signals for at least one operational parameter range when plotting the wind direction compensation signals.

19. The yaw auto-calibration system according to claim 14, wherein the calculation module is configured to plot the wind direction compensation signal relative to one of rotor speed or generator speed and adjust the wind direction compensation signal based on the measured turbine power.

20. The yaw auto-calibration system according to claim 11, wherein the collection module is configured to use two dimensional binning, wherein there are a plurality of bin matrixes, each matrix corresponding to a different range of a first operational parameter and each matrix including a range of a second operational parameter relative to the range of wind directions.

* * * * *